US012146708B2

(12) United States Patent
Palmer

(10) Patent No.: US 12,146,708 B2
(45) **Date of Patent: *Nov. 19, 2024**

(54) COSMETIC MAKEUP SPONGE/BLENDER CONTAINER

(71) Applicant: NYC Designed Inspirations LLC, Mamaroneck, NY (US)

(72) Inventor: Samantha Palmer, Larchmont, NY (US)

(73) Assignee: NYC Designed Inspirations LLC, Mamaroneck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,124

(22) Filed: Apr. 28, 2023

(65) Prior Publication Data

US 2023/0258402 A1 Aug. 17, 2023

Related U.S. Application Data

(63) Continuation of application No. 17/548,501, filed on Dec. 11, 2021, now Pat. No. 11,662,143, which is a (Continued)

(51) Int. Cl.

| | |
|---|---|
| ***F26B 21/12*** | (2006.01) |
| ***A45D 34/00*** | (2006.01) |
| ***A45D 34/04*** | (2006.01) |
| ***B65D 25/24*** | (2006.01) |
| ***B65D 47/32*** | (2006.01) |

(Continued)

(52) U.S. Cl.

CPC .............. *F26B 21/12* (2013.01); *A45D 34/00* (2013.01); *A45D 34/04* (2013.01); *B65D 25/24* (2013.01); *B65D 47/32* (2013.01); *F26B 9/003* (2013.01); *F26B 25/06* (2013.01); *A45D 2034/002* (2013.01); *A45D 2200/1009* (2013.01)

(58) Field of Classification Search

CPC .......... F26B 21/12; F26B 9/003; F26B 25/06; A45D 34/00; A45D 34/04; A45D 2034/002; A45D 2200/1009; B65D 25/24; B65D 47/32

USPC ............................................................ 34/487

See application file for complete search history.

(56) References Cited

U.S. PATENT DOCUMENTS 558,535 A * 4/1896 Vivian ................ B65D 21/086 220/8

2,555,047 A * 5/1951 Logue .................... A45C 11/24 239/57

(Continued)

*Primary Examiner* — Stephen M Gravini

(74) *Attorney, Agent, or Firm* — Charney IP Law LLC

(57) ABSTRACT

A cosmetic sponge drying and storage container has a plurality of components, including at least a first component and a second component, the first component being moveable with respect to the second component to position the container in at least an open condition and a closed condition. At least one of the first component or said second component is perforated with perforations. A cosmetic sponge may be placed within the container when in the open condition and the perforations provide at least 10% ventilation when the container is in the closed condition. Preferably, both the first and second components are perforated to provide for cross-ventilation. In addition, a base may be provided to support the first and second components, and most preferably the base may be perforated.

19 Claims, 23 Drawing Sheets

Related U.S. Application Data continuation of application No. 17/462,232, filed on Aug. 31, 2021, now Pat. No. 11,231,228, which is a continuation of application No. 16/665,021, filed on Oct. 28, 2019, now Pat. No. 11,125,502, which is a continuation of application No. 15/879,609, filed on Jan. 25, 2018, now Pat. No. 10,458,706, which is a continuation of application No. 15/052,843, filed on Feb. 24, 2016, now Pat. No. 9,897,378.

(60) Provisional application No. 62/238,853, filed on Oct. 8, 2015.

(51) Int. Cl.
*F26B 9/00* (2006.01)
*F26B 25/06* (2006.01)

(56) References Cited

U.S. PATENT DOCUMENTS

| | | | | | |
|---|---|---|---|---|---|
| 3,441,033 | A * | 4/1969 | Flax | A45D 33/20 | 132/295 |
| 4,258,874 | A * | 3/1981 | Webinger | A61L 9/12 | 229/4.5 |
| D317,044 | S * | 5/1991 | Thomson | D23/367 | |
| 5,526,966 | A * | 6/1996 | Lutzker | B65D 11/02 | 222/548 |
| 6,085,442 | A * | 7/2000 | Erickson | A01J 13/00 | 34/381 |
| 6,540,083 | B2 * | 4/2003 | Shih | A45D 40/24 | 224/604 |
| 7,884,336 | B2 * | 2/2011 | Gibson | A47L 13/17 | 15/208 |
| 9,897,378 | B2 * | 2/2018 | Palmer | A45D 34/00 | |
| 10,145,611 | B1 * | 12/2018 | Palmer | F26B 21/12 | |
| 10,458,706 | B2 * | 10/2019 | Palmer | A45D 34/00 | |
| 11,125,502 | B2 * | 9/2021 | Palmer | F26B 21/12 | |
| 11,231,228 | B2 * | 1/2022 | Palmer | B65D 47/32 | |
| 11,662,143 | B2 * | 5/2023 | Palmer | B65D 25/24 | 34/487 |
| 2023/0258402 | A1 * | 8/2023 | Palmer | B65D 47/32 | 34/487 |

* cited by examiner

COSMETIC MAKEUP SPONGE/BLENDER CONTAINER

CROSS REFERENCE TO RELATED APPLICATIONS

The present application claims benefit of U.S. patent application Ser. No. 17/548,501, filed Dec. 11, 2021, which issued as U.S. Pat. No. 11,662,143 on May 30, 2023, which claims the benefit of U.S. patent application Ser. No. 17/462,232, filed Aug. 31, 2021, which issued as U.S. Pat. No. 11,231,228 on Jan. 25, 2022, which claims the benefit of U.S. patent application Ser. No. 16/665,021, filed Oct. 28, 2019, which issued as U.S. Pat. No. 11,125,502 on Oct. 28, 2019, which claims the benefit of U.S. patent application Ser. No. 15/879,609, filed Jan. 25, 2018, which issued as U.S. Pat. No. 10,458,706 on Jan. 24, 2018, which claims the benefit of U.S. patent application Ser. No. 15/052,843, filed Feb. 24, 2016, which issued as U.S. Pat. No. 9,897,378 on Feb. 20, 2018, and which claims the benefit of U.S. Provisional Patent Application Ser. No. 62/238,853, filed Oct. 8, 2015, the disclosures of which are hereby incorporated by reference herein.

BACKGROUND OF THE INVENTION

The present invention relates to cosmetics, and in particular to containers for storage and transport of cosmetic makeup sponges, which are often referred to as blenders. Moving forward in this disclosure, the makeup sponges will be referred to as sponges/blenders.

Conventional reusable oval shaped cosmetic sponges/blenders have been commercially available to the cosmetics industry for approximately ten years. These sponges/blenders are mostly used to apply foundation, tinted moisturizer, or cream blush to the face, without the direct application through use of fingers or brushes. The sponge/blender creates a smooth flawless finish and/or a base for further makeup. Although different shape cosmetic sponges/blenders have been available for more than a decade, the oval or tapered egg shape sponge/blender has become increasingly popular in recent years and represents the standard in commercial use.

Using a sponge/blender is simple; first a user wets the sponge/blender with water until it is completely saturated. Note that as the sponge/blender absorbs water it increases in size. The user then squeezes out excess water and dabs the sponge/blender into the desired makeup, generally a foundation makeup. Then a user applies the makeup to the face; smoothing and dabbing until the face is covered in makeup to the desired look. The cosmetic sponge/blender is also ideal for applying SPF sunscreen and self-tanner for even coverage.

It is impractical to restore the sponge/blender to its original condition as oil based makeup tends to accumulate on and within the sponge/blender, even after washing. However, with proper care the majority of manufacturers claim that sponges/blenders have a lifespan of approximately three months. To lengthen the lifespan, it is recommended that the sponge/blender be cleaned with soapy water every three to five days of use to avoid build-up of makeup or other residue. After cleaning, although squeezed dry, the sponge/blender does remain damp and with the dampness it retains excess makeup product. It is recommended that one allow time to completely dry the sponge/blender before returning it to the makeup bag. However, this is often not practical as most women prefer to carry the sponge/blender with their makeup collection and there is insufficient time to permit adequate drying before travelling with the sponge/blender.

As such, after using the sponge/blender to apply foundation, the sponge/blender is typically immediately returned to the makeup bag where it remains damp. Very soon the inside of the makeup bag becomes messy and unusable as foundation or other makeup product transfers from the sponge/blender to the inside of the makeup bag and/or other makeup.

Additionally, the sponge/blender itself becomes subject to fouling. For example, cross-contamination may occur when black eyeliner pencils or eye shadow applicators deposit contents onto the sponge/blender. Hygiene is also a concern; once the sponge/blender is exposed to other components while loose in the bag, it is a magnet for bacteria, which is later wiped on the face. Each of these results is highly undesirable.

To combat some of these issues users began storing sponge/blenders in plastic bags. However, it was soon discovered that by locking in moisture and not allowing sufficient air to circulate, mold and bad odor built-up on the sponge/blender and as a consequence the sponge/blender became unusable rather quickly. When storing in a small minimally vented plastic container, the same problem occurred as without proper ventilation, the sponge/blender was unable to dry out before mold and bacteria began to grow.

BRIEF SUMMARY OF THE INVENTION

It would therefore be beneficial to provide a manner in which a user may travel with a sponge/blender without the need for mandated pre-drying, and indeed permitting drying while stored, without compromising its usefulness. The present invention presents such a solution by providing a protective container with adequate ventilation to dry a sponge/blender. Preferably, the ventilation is provided in a manner which also protects the sponge/blender from foreign objects.

In accordance with a first embodiment of the present invention, a A cosmetic sponge container comprises a base, the base having a generally horizontal bottom surface; a grill, the grill being affixed to the base at a proximal end of the grill and extending in a generally vertical orientation from the proximal end in a direction opposite the downwardly depending portion to a distal end thereof; and a shell, the shell being rotatably engaged with the base and the grill while extending from the base generally parallel to the grill, the shell having a distal end opposite the base; wherein rotation of the shell relative to the grill creates an adjustable opening into an interior space formed by the grill and the shell above the generally horizontal surface of the base; and wherein at least one of the base, the grill, or the shell is perforated with perforations such that a moistened cosmetic sponge may be stored within the interior space to dry.

The distal end of the grill and the distal end of the shell may form an opening into the interior space regardless of the position of the shell relative to the grill, the opening providing cross-ventilation with the perforations. In such case, the base may further comprise a downwardly dependent portion such that the bottom surface is elevated off a supporting platform upon which the container is placed.

The grill and the base may be perforated.

Rotation of the shell relative to the grill may be achieved through a recessed track and bead arrangement, wherein the bead rides within the recessed track.

The grill and the base may be perforated and the perforations may be sufficiently sized to permit airflow through same but to deny access to a sponge stored within the interior space by foreign objects sized and configured in the shape of a mascara pencil.

The grill and the base may be perforated and the perforations of the grill and the perforations of the base may provide at least 50% ventilation.

The grill and the base may be perforated and the perforation of the grill and the perforations of the base may provide at least 75% ventilation.

The grill and the base may be perforated and the base may be circular along the path of rotation of the shell and the shell and the grill may be approximately equal in size along the path of rotation such that the shell may overlap the grill to position the adjustable opening as an approximately 180 degree opening.

The distal end of the grill and the distal end of the shell may form an opening into the interior space regardless of the position of the shell relative to the grill, and the base and the grill may be perforated with perforations; and the perforations and the opening may provide cross-ventilation.

In accordance with a further aspect of the invention, a method of drying a cosmetic sponge may include the steps of placing a moistened cosmetic sponge within a cosmetic sponge container having ventilation of at least 10%, the ventilation being such that cross-ventilation is created, and allowing the moistened sponge to dry.

The ventilation may be adjustable ventilation, the method further comprising adjusting the level of ventilation after the sponge has been placed within the cosmetic sponge container. If so, the adjustable ventilation may be achieved via rotation of one member of the cosmetic sponge container relative to another member of the cosmetic sponge container.

The adjustable ventilation may be at least 25% ventilation, and 25% ventilation may be achieved when rotation of one member of the cosmetic sponge container is in a first position relative to another member of the cosmetic sponge container and a greater percentage of ventilation is achieved when rotation of the one member of the cosmetic sponge container is in a second position relative to the another member of the cosmetic sponge container. Given this, the one member of the cosmetic sponge container and the another member of the cosmetic sponge may define an opening into the container.

In accordance with another aspect of the invention, a cosmetic sponge drying and storage container comprises a plurality of components, including at least a first component and a second component, the first component being moveable with respect to the second component to position the container in at least an open condition and a closed condition, wherein at least one of the first component or the second component is perforated with perforations; and wherein, a cosmetic sponge may be placed within the container when in the open condition and wherein the perforations provide at least 10% ventilation when the container is in the closed condition.

The cosmetic sponge drying and storage container may further comprise a base having a generally horizontal bottom surface and supports for elevating the bottom surface above a support upon which the container may be placed, the bottom surface being perforated.

Moveable may be by one of rotation or sliding.

The perforations may provide cross-ventilation.

Where the perforations provide cross-ventilation, the container may further comprise at least one additional opening at distal ends of the first component and second component, providing cross-ventilation with the perforations.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, will be or become apparent to one with skill in the art upon reference to the following detailed description when read with the accompanying drawings. It is intended that any additional organizations, methods of operation, features, objects or advantages ascertained by one skilled in the art be included within this description, be within the scope of the present invention, and be protected by the accompanying claims.

With respect to the drawings.

DETAILED DESCRIPTION

Figure 1:
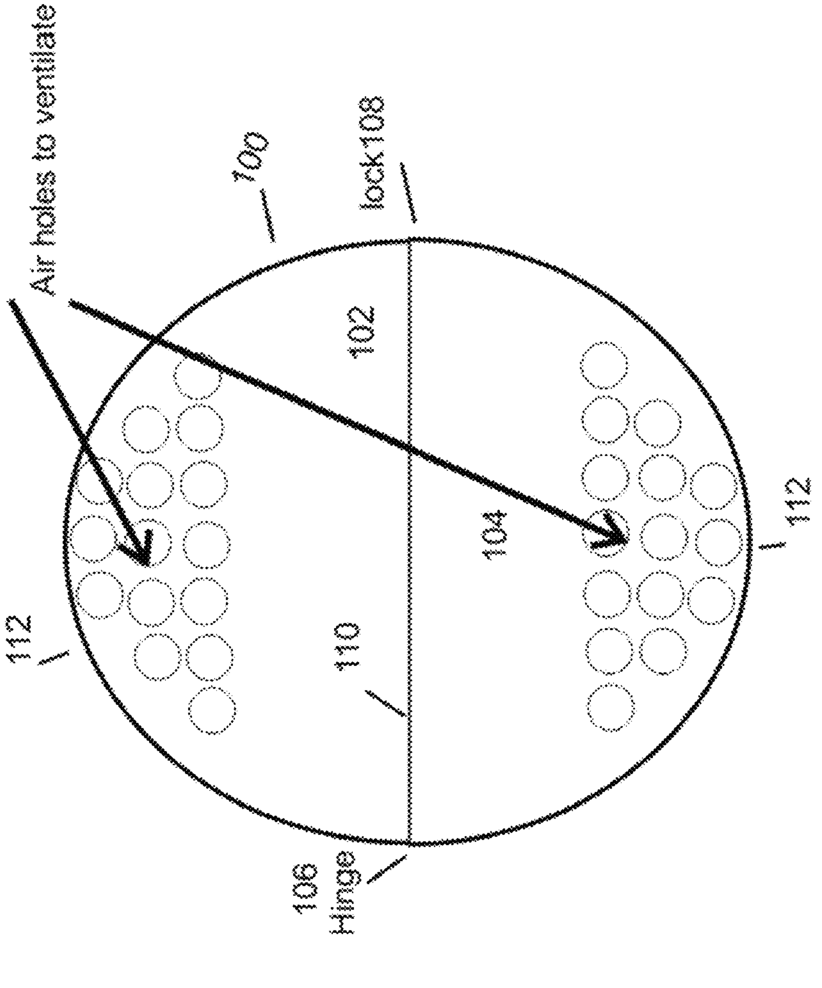
FIG. 1 is a side view of an inventive container in accordance with a first embodiment of the present invention, the container shown in the closed condition.

In the following are described the preferred embodiments of the COSMETIC MAKEUP SPONGE/BLENDER CONTAINER in accordance with the present disclosure. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

When identifying a solution for storing and transporting a makeup sponge/blender, such that a user may return the sponge/blender to a cosmetics or handbag immediately after use, the following factors may be considered:

1. Space in a women's cosmetics bag or handbag is of a premium. It is preferred that any container retain the shape of the popular oval shape sponge/blender, keeping the total volume used in the makeup bag to a minimum. This should be balanced against ventilation within the container (see #2 below). Thus the container size is preferably designed approximately mere centimeters, perhaps 1 cm to 3 cm, and preferably 2 cm, in diameter larger than the sponge/blender while wet. This will allow air to circulate while the sponge/blender is in the container and drying out.

Figure 17:
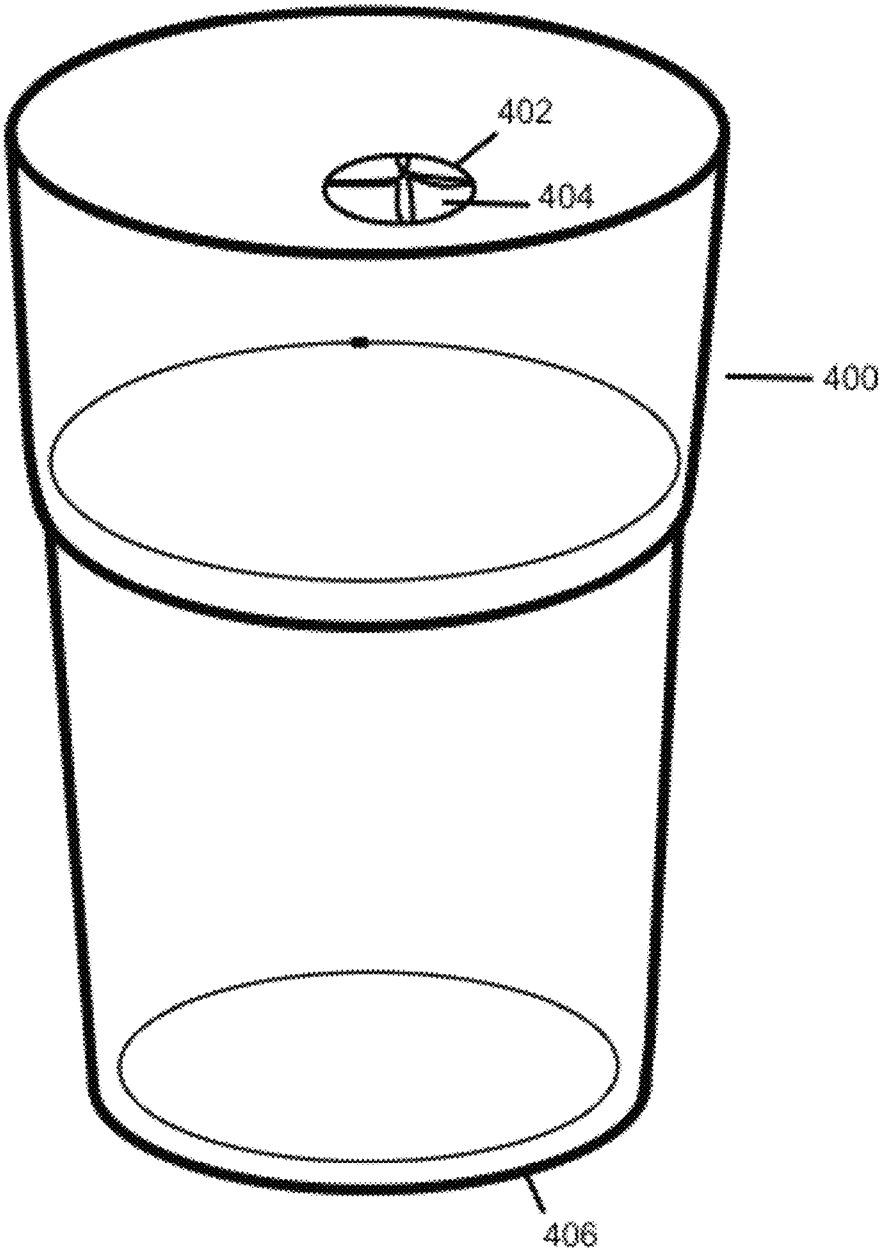
FIG. 17 is perspective view of a first sponge/blender container, particularly used for test purposes, the first sponge/blender container being a conventional container.

2. Ventilation is of utmost importance and essential. It is important for the container to include a minimum of approximately 10% total surface area ventilation, allowing the sponge/blender enough airflow to dry out thoroughly after use. Preferably the surface area ventilation is approximately 25% to 75% with at least 50% being preferred and 65% to 70% being most preferred. Other ventilation percentages include 20%, 25%, 30%, 35%, 40%, 45%, 50%, 55%, 60%, 65%, 70%, 75%, 80%, or 85%. Ventilation ranges include 10-25%, 10-50%, 10-75%, 25-50%, 50-75%, 60-75%, 65-75%, and 70%-75%. If adequate ventilation is not included to the design, the sponge/blender will not have an opportunity to dry out, allowing an opportunity for bacteria to grow. For example, conventional sponge/blender containers, such as the container 400 shown in FIG. 17, provide only approximately 6-8% ventilation, and certainly less than 10% ventilation.

When discussing ventilation herein, it is to be understood that an open, or partially open, container includes increased ventilation over a closed container. Generally, ventilation figures in terms of percentage will be provided for containers in the closed condition.

3. In addition to the total ventilation percentage, it has been found that the provision of "cross-ventilation" is also highly beneficial. The term "cross-ventilation" is to be understood as the provision of a ventilation path through a container. A prime example of "cross-ventilation" is where apertures are provided on the bottom of the device and at least a side of the device or the top of the device, preferably both. Another example is where apertures are provided on the side of the device and the top. Thus, ambient air can flow through device, in one location and out another, through a ventilation path. Cross-ventilation is not provided when only the bottom of the device or only the top of the device is ventilated. Depending on the configuration of the vents, cross-ventilation may be provided when the sides of the device alone are ventilated, provided that the ventilation is adequately spaced to allot for crossing of the container's interior, for example where at least two apertures are approximately 180 degrees apart, or where two apertures are at least 120 degrees apart.

4. While it is essential to consider the size of the ventilation holes as discussed above, they preferably should only be large enough to ensure effectiveness, yet small enough to avoid other makeup or accessories from accessing into the container through the ventilation holes. For example, eyeliner pencils and eye shadow accessories are major culprits as they can enter the container through ventilation holes that are too large.

5. The container is preferably designed to stand independently. While in an open condition, the opening of the container allows 50% or more of the sponge/blender total exposure to the air; in addition to any ventilation provided in the remainder of the container in the open condition. If not returning immediately to the makeup bag this is an additional feature to allow time for the sponge/blender to dry while standing independently in its own container.

6. Consideration should be given during the manufacturing process to ensure the best choice of materials, which are preferably rigid plastic but may also be various other materials such as metals or metal alloys. This will assist in reducing the amount of moisture able to build up while the sponge is drying out in the ventilated container because the container will not collapse on the sponge/blender. In other embodiments, the material may be soft of pliable. It is also preferred that the materials used be antimicrobial or have antimicrobial coatings.

With these considerations in mind, FIG. 1 depicts a sponge/blender container 100 in accordance with a first embodiment of the present invention in a closed condition. The container 100 is configured in an "egg-shaped" geometry to match the shape of a conventional sponge/blender (not shown). Other shapes, whether geometric or non-geometric, may also be considered. As explained above, it is preferred that the overall diameter of the container 100 be approximately 1 cm to 3 cm, and preferably 2 cm, larger than a moistened sponge/blender to ensure air circulation around the sponge/blender when placed in the closed container.

The container 100 includes an upper portion 102 and a lower portion 104 connected by a hinge 106. Preferably the container is an antimicrobial plastic and the hinge 106 is a living hinge. Other hinges, whether integrated to the container 100 or not, may also be utilized. Additionally, other materials such as various metals or metal alloys may also be utilized.

It will be appreciated that in the embodiment shown, the upper portion 102 and lower portion 104 of the container 100 roughly split the container into two equal sized portions in the vicinity of the absolute largest diameter of the container. However, this need not be the case and the dividing line can be other than at the absolute largest diameter of the container 100.

Opposite the hinge 106 is a locking mechanism 108. Preferably the locking mechanism 108 incorporates a friction or interference type lock, although other arrangements are possible. When locked, it is preferred that the interface line 110 between the upper portion 102 and lower portion 104 be tightly configured, although it need not be airtight.

Figure 3:
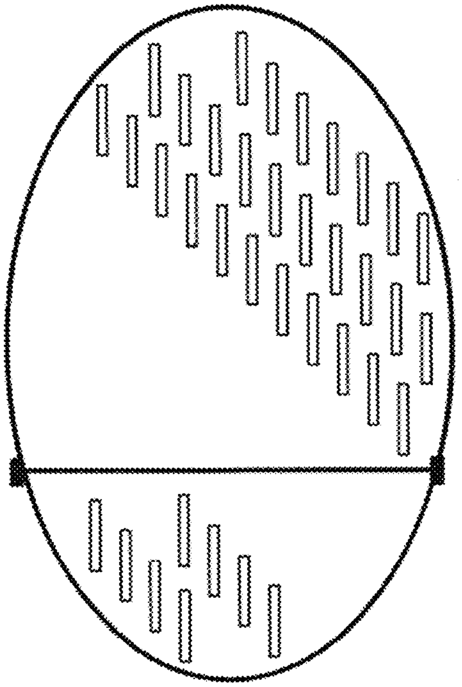
FIGS. 3-5 are side views of additional embodiments of inventive containers, depicting various configurations of perforations.
Figure 4:
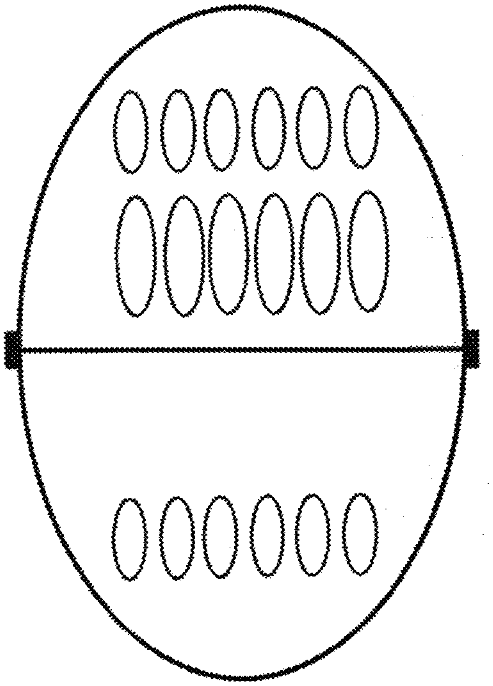
Figure 5:
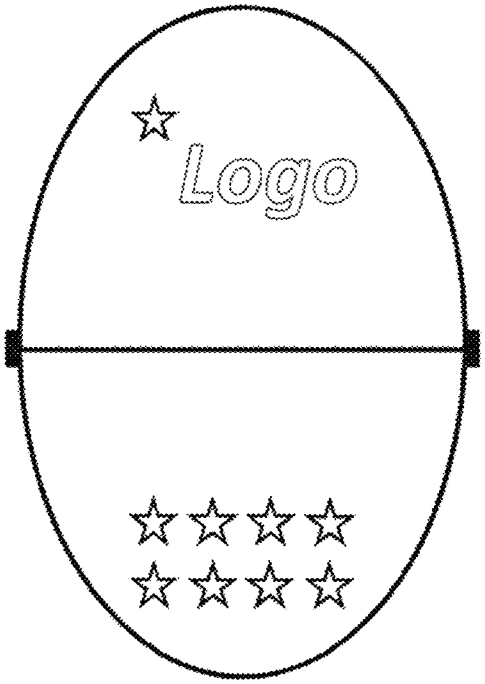

Ventilation through the container 100 is provided by apertures 112, such as the round apertures shown in FIG. 1. In other configurations the apertures may be other geometric or non-geometric shapes, including ovals, squares, triangles, stars, random patterns, flower pedals, etc. Moreover, the apertures may be configured as designs, such as corporate logos, words, pictures, or the like. Lastly, the apertures may be mixed, such that not all apertures of a particular container are the same shape nor the same size. Additional examples of aperture configurations are shown in FIGS. 3-5.

It is important for the container 100 to include a minimum of approximately 10% surface area ventilation throughout the entire container's apertures 112, allowing the sponge/blender enough airflow to dry out thoroughly after use. Preferably the surface area ventilation is approximately 25% to 70% with 50% being preferred and 65% to 70% being most preferred.

Figure 2:
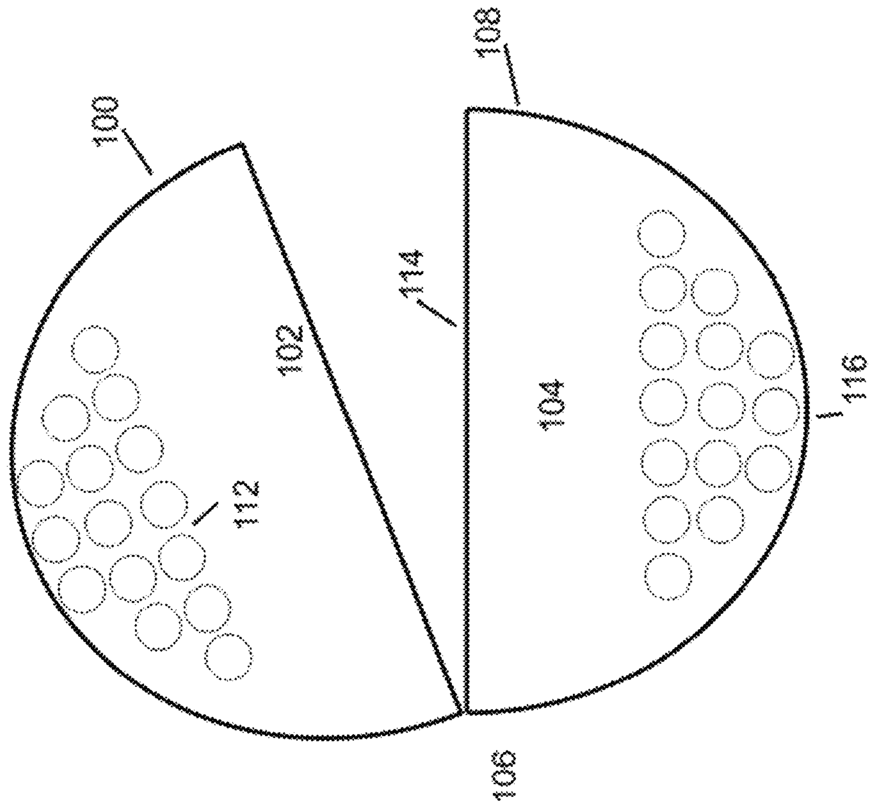
FIG. 2 is a side view of the inventive container of FIG. 1, in a partially open condition.

FIG. 2 depicts the container 100 of FIG. 1 in a partially open configuration. In this configuration, the sponge/blender (not shown) can be placed within the well 114 of the lower portion 104. In some embodiments, the extreme bottom 116 of the container 100 is flat such that the container can stand independently.

Although not shown in this embodiment, it is also contemplated that the container 100 include offsets or stand-offs within the interior to prevent the sponge/blender from contacting the inner surface of the container directly. Such offsets or stand-offs may be in the form of bulges or other protrusions. Preferably, the offset or stand-offs are approximately one half of the size of the desired total gap between the sponge/blender and the inner surface of the container, such that each side of the sponge/blender will be offset from the container one half of the desired total distance. For example, to maintain a preferred 2 cm difference in diameters between the sponge/blender and the container, each of the offsets or stand-offs will be 1 cm in height.

In a preferred embodiment of the invention, a container is formed from three components with a rotation feature permitting infinitely variable ventilation. An example of such a container is shown in FIGS. 6-14, FIG. 6 of which is a perspective view.

Figure 6:
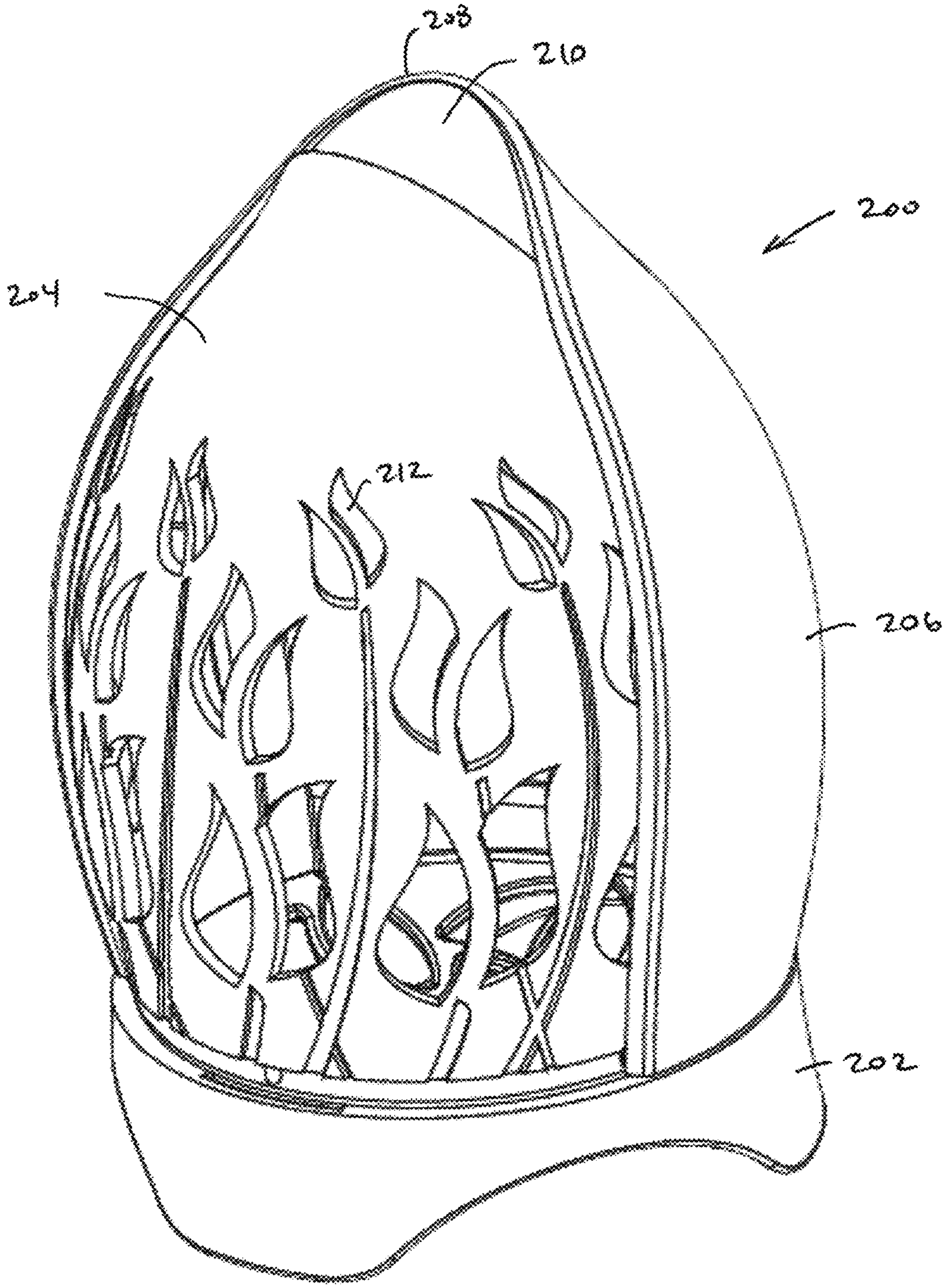
FIG. 6 is a perspective view of an inventive container in accordance with a preferred embodiment of the present invention, the container being in a closed condition.

As shown in FIG. 6, the container 200 features an overall shape providing the visual appearance of a flower bud. This distinct container is formed from a base 202 with a grill 204 and shell 206, both extending upwardly therefrom. At the distal end 208 of the container 200 the grill 204 and shell 206 form an opening 210, which arches to aid in the visual appearance of a flower bud shaped container.

In other embodiments, particularly where intrusion by foreign objects is a large concern, the grill 204 and shell 206 may close on each other so as to form a smaller opening 210 or no opening at all.

It will be appreciated that the grill 204 contains a number of perforations, also referred to as apertures or ventilation. In this embodiment apertures 212 are shaped in the form of flowers, complete with pedals and stems. In other embodiments, the apertures may be other geometric or non-geometric shapes, including circles, ovals, squares, triangles, stars, random patterns, etc. Moreover, the apertures may be configured as designs, such as corporate logos, words, pictures, or the like. Lastly, the apertures may be mixed, such that not all apertures of a particular container are the same shape nor the same size.

Figure 7:
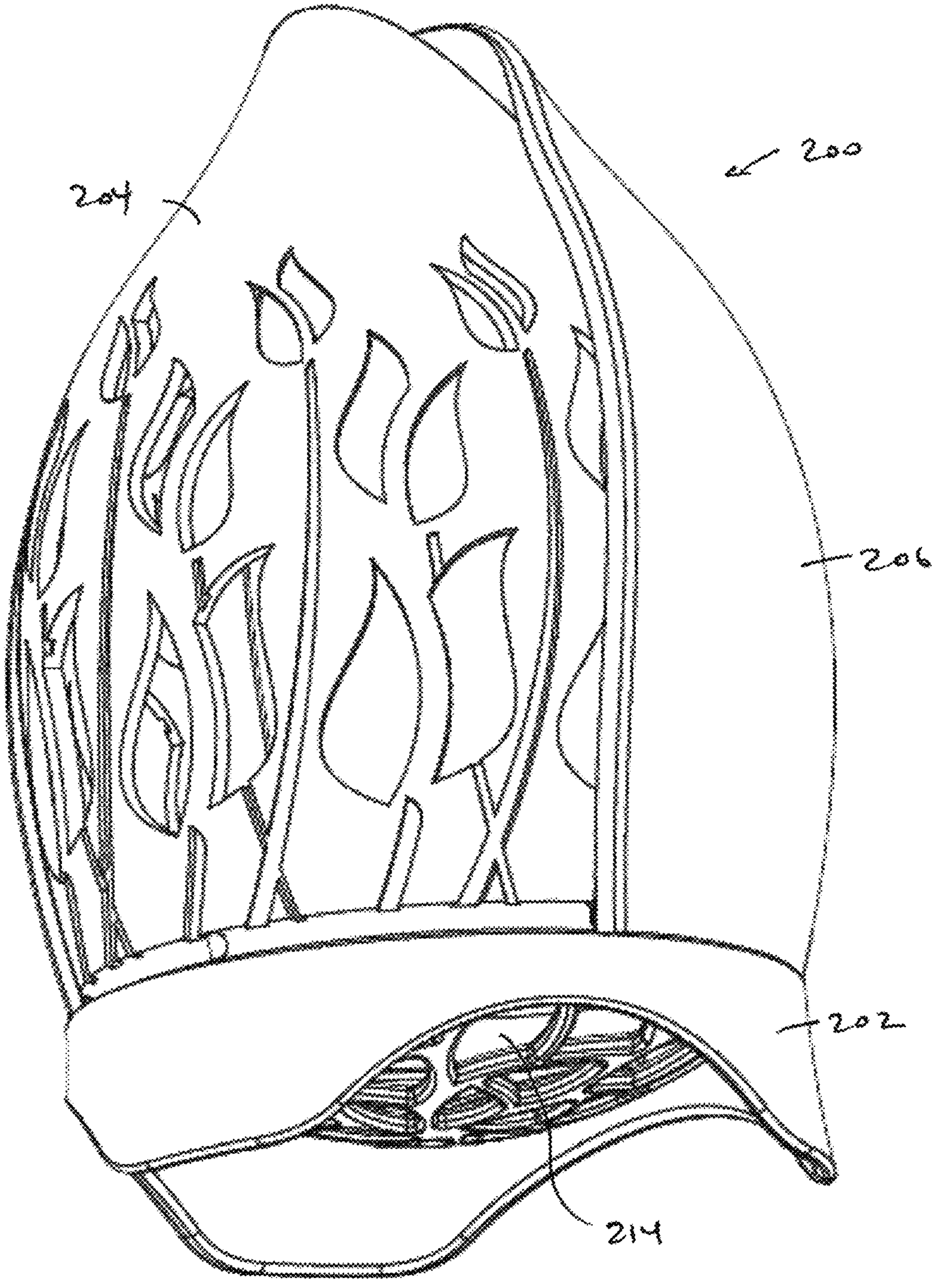
FIG. 7 is a perspective view of the container of FIG. 6, shown from partially beneath the container.

As better shown in FIG. 7, a lower angle perspective view of the container 200, it will be appreciated that the base 202 is also configured with perforations, or apertures 214.

Figure 8:
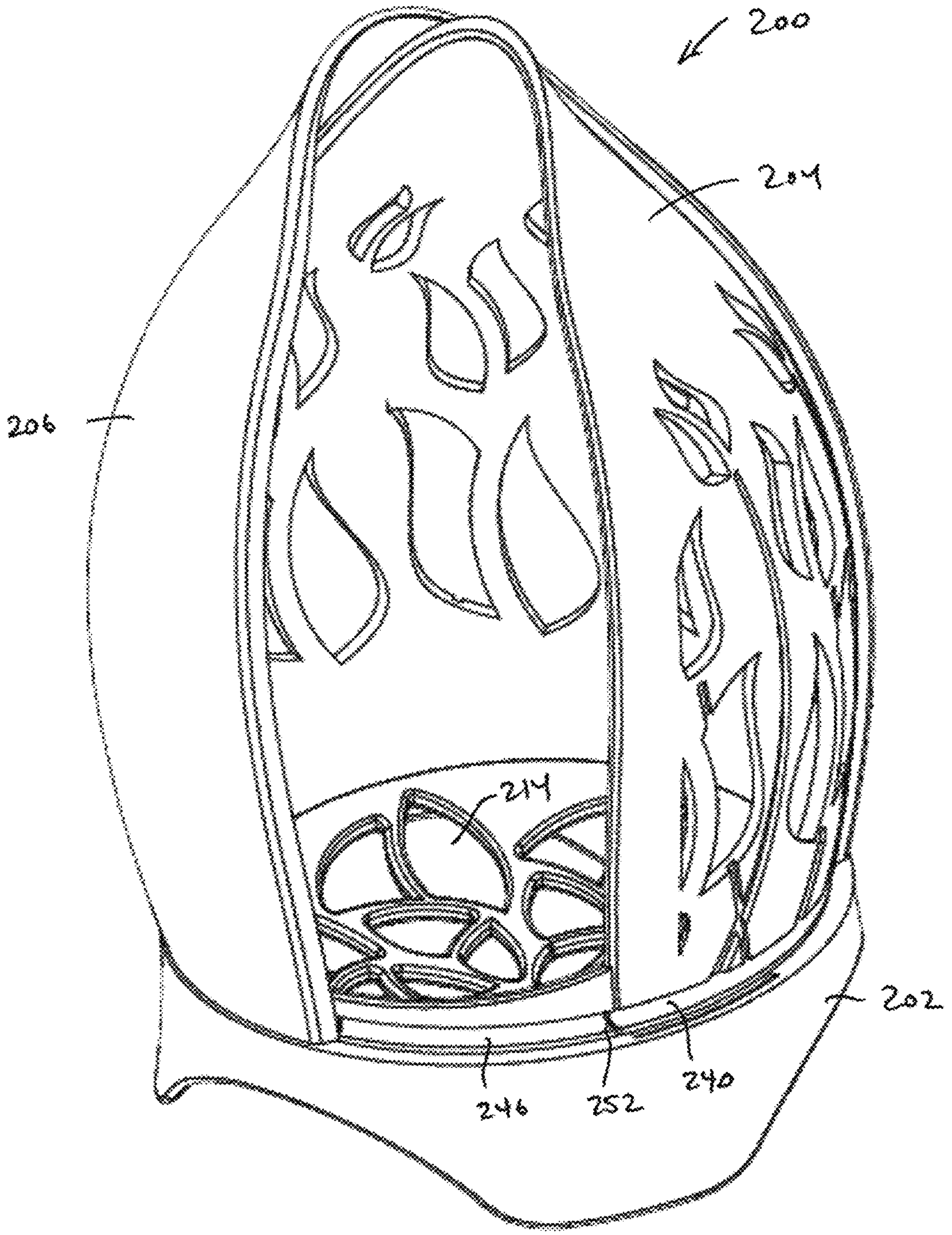
FIG. 8 is a perspective view of the container of FIG. 6, the container shown in a partially open condition.
Figure 9:
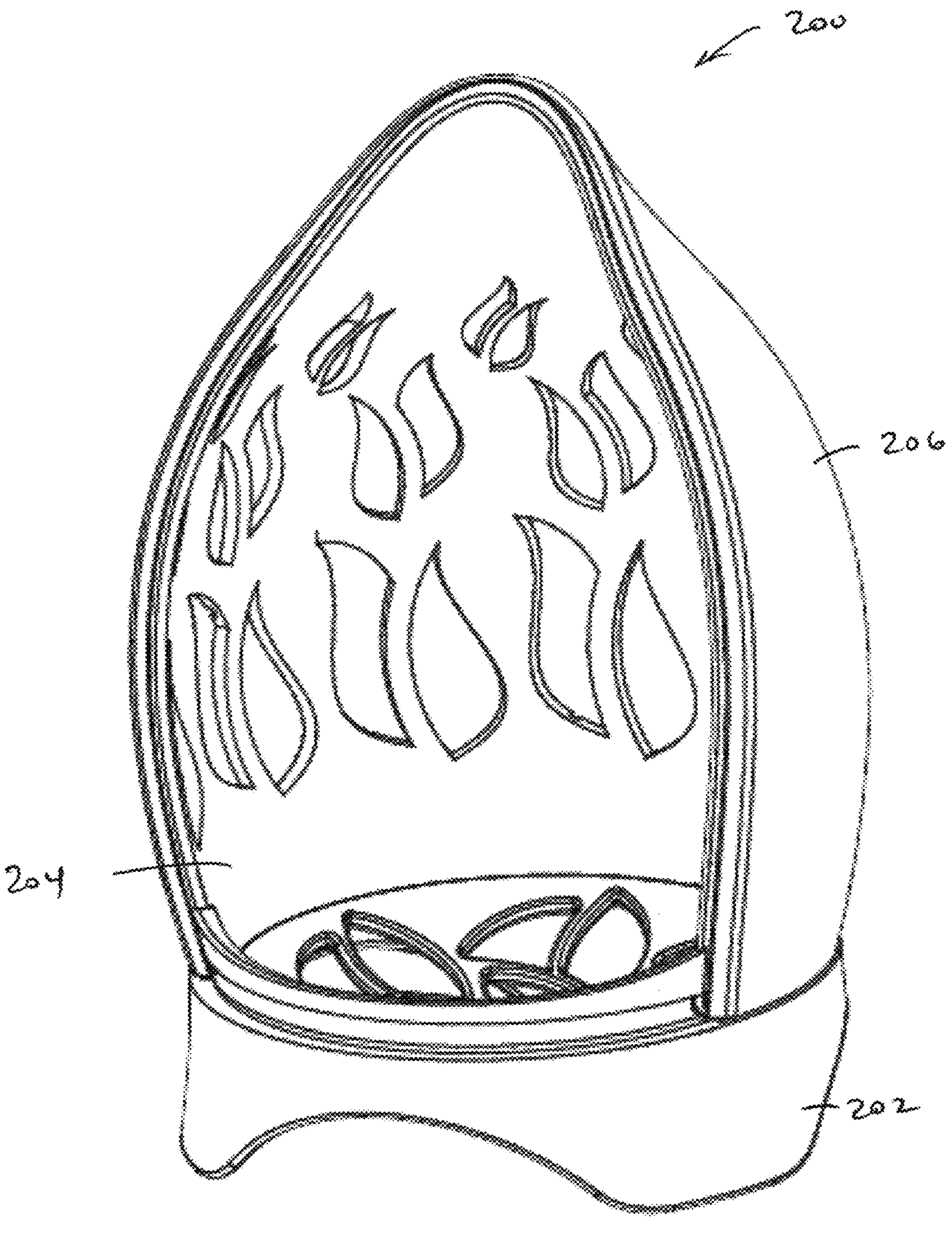
FIG. 9 is a perspective view of the container of FIG. 6, the container shown in the fully open condition.

The container 200 is shown in FIGS. 6 and 7 in the fully closed condition, such that the grill 204 and shell 206 completely surround the interior of the container above the base 202. It will be appreciated that the container 200 may be opened by rotation of the shell 206 about the grill 204, thus exposing the interior above the base 202. A container 200 in a partially opened condition is shown in FIG. 8, where the shell 206 has been rotated approximately 90 degrees about the grill 204 from the completely closed configuration shown in FIGS. 1 and 2. Of note, and in the embodiment shown, the shell 206 may rotate from less than 1 degree to 180 degrees through infinitely variable adjustments to provide infinitely variable levels of opening. While there are various configurations and methods of providing for such rotation, the configuration and method of rotation used for the preferred embodiment of the invention shown in FIGS. 6-14 will be discussed below. Generally speaking, however, it will be appreciated that the grill 204 is fixed to the base 202 while the shell 206 is free to rotate around the base and about the grill via a continuous track formed by the base and grill. FIG. 9 shows a perspective view of the container 100 in a fully open condition.

In other embodiments, rotation may be limited to less than 180 degrees or expanded beyond 180 degrees. To expand beyond 180 degrees, it will be appreciated that the container may include two shells rather than one, where the two shells and the associated grill are each sized approximately ⅓ of the total 360 degree circumference of the base. In that case, sliding of the two shells such that they overlap will open the container greater than 180 degrees, and more in the range of 240 degrees. Other similar arrangements may also be provided.

FIGS. 6 and 7 provide an opportunity to view ventilation paths through the container 200. One ventilation path extends from apertures 214 to apertures 212; another extends from apertures 214 to opening 210; and a third extends from apertures 212 to opening 210. Each of these ventilation paths also extends in the opposite direction depending on the movement of air through the container 200.

The total ventilation of container 200 is approximately 65-70% in the closed condition, accounting for the apertures and the top opening. The grill 204 itself has been calculated to be 42% vented, with a range of 40-45% considered preferable.

Figure 10:
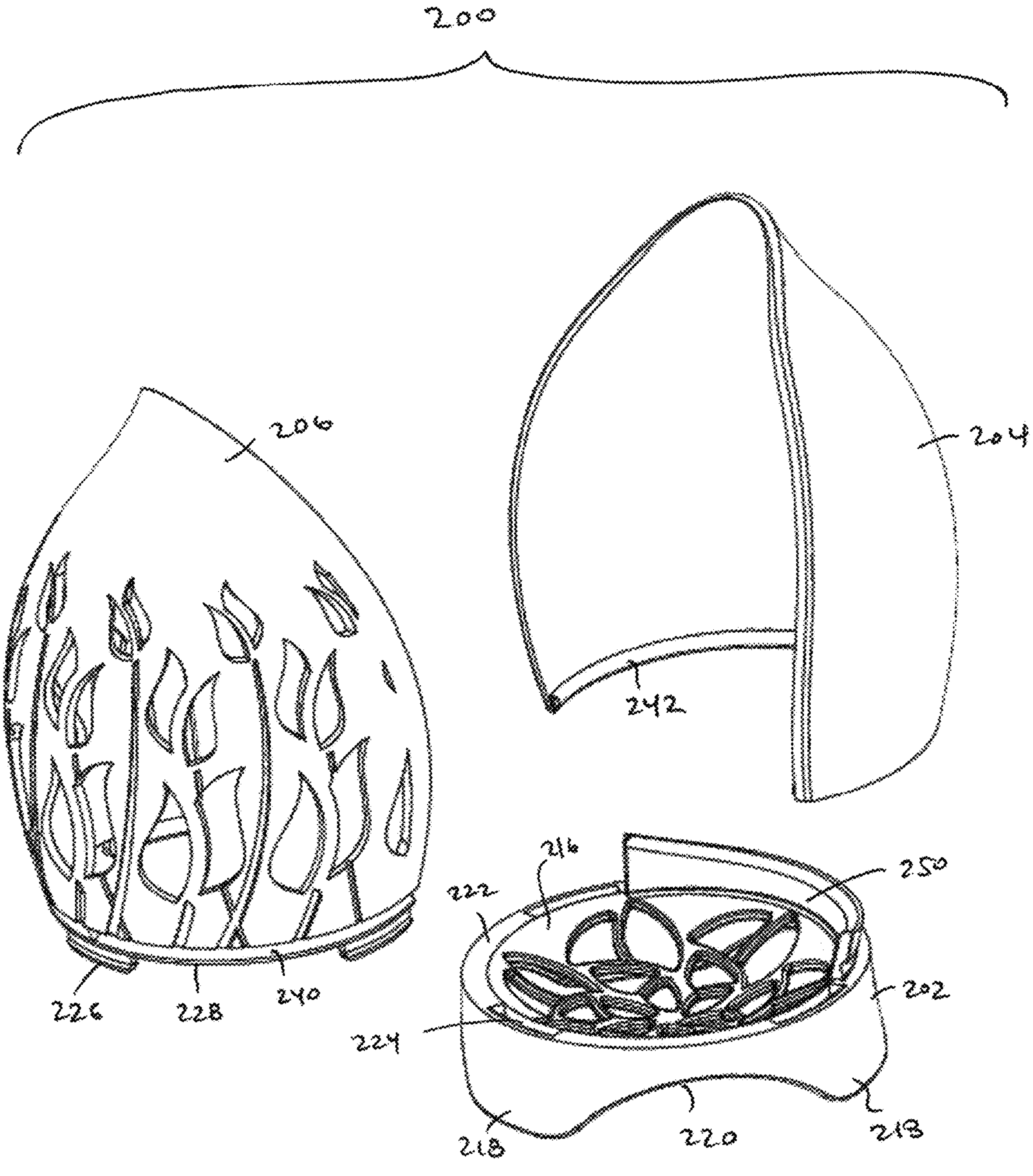
FIGS. 10 and 11 are exploded perspective views of the container of FIG. 6.

With the introduction of FIGS. 10 through 12 and 14, each exploded views of the container 200 from different angles, specific elements of the various components of the container may be discussed more clearly. Starting at the bottom of the container as shown in the view of FIG. 10, it will be appreciated that the base 202 is configured in a generally round configuration with a floor 216 and plurality of downwardly depending feet 218. In the embodiment shown, the floor 216 is concave such that a sponge/blender placed thereon will be retained within the well formed by concave cavity. The floor 216 also includes the apertures 214 to allow excess liquid to drip from the container 200 while also permitting air to exchange between within and below the container.

The downwardly depending feet 218 in the embodiment shown are relatively large and include an arcuate portion 220 between adjacent feet. It will be appreciated that various other configurations may be utilized both for aesthetic and functional purposes, so long as the floor 216 of the container 200 is lifted from the surface (not shown) upon which the container is to be placed. In alternative embodiments, the base 202 may not include downwardly depending feet and the floor 216 may sit directly on the surface (not shown) upon which the container is to be placed. Likewise, in alternate embodiments, whether with downwardly depending feet or without, the floor 216 may not be perforated. In the event the floor is not perforated (or possibly even if it is), the floor may include a mirror (not shown) on the underside of the container to aid in the application of makeup.

Figure 13:
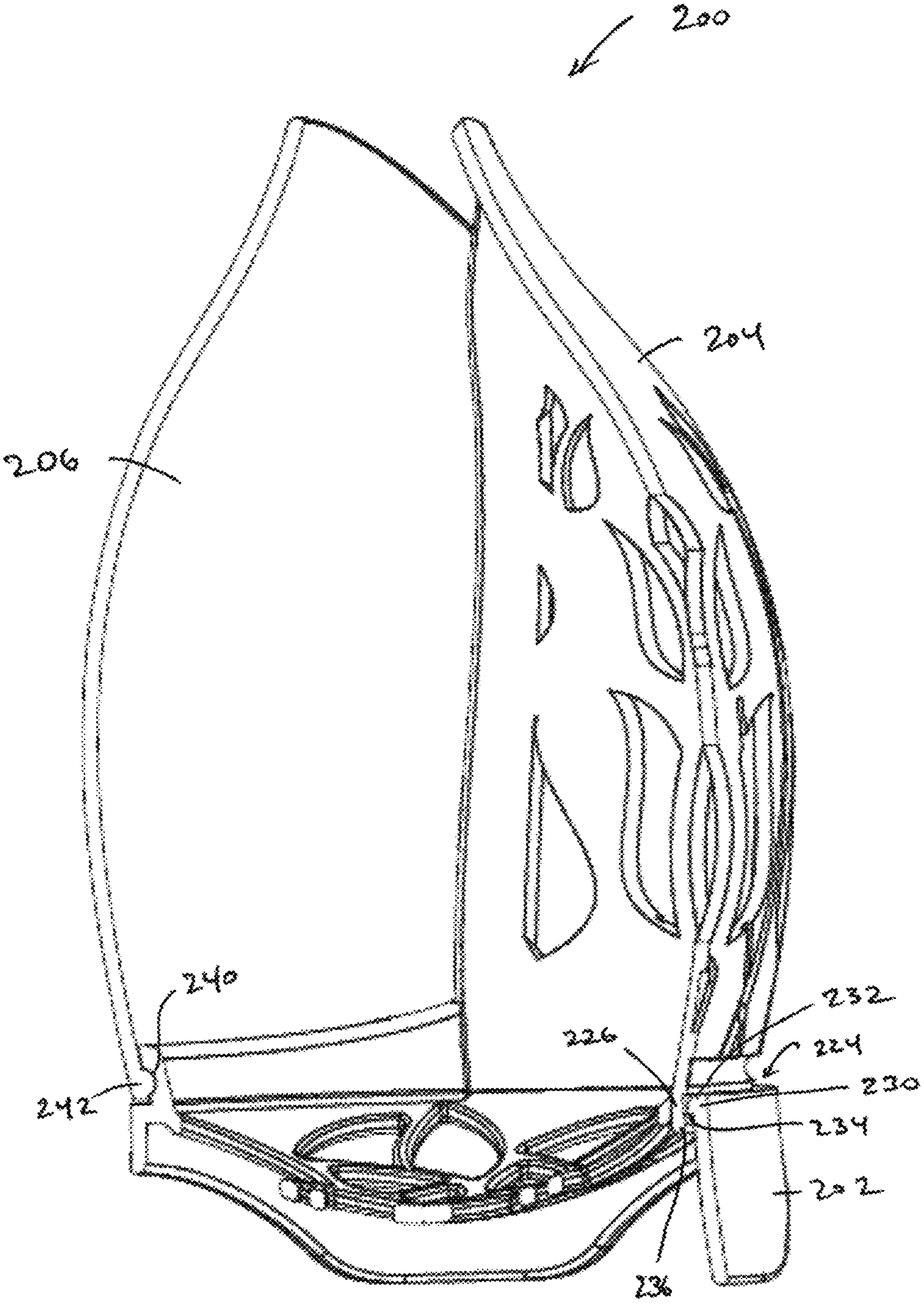
FIG. 13 is a cross-sectional view of the container of FIG. 6.
Figure 14:
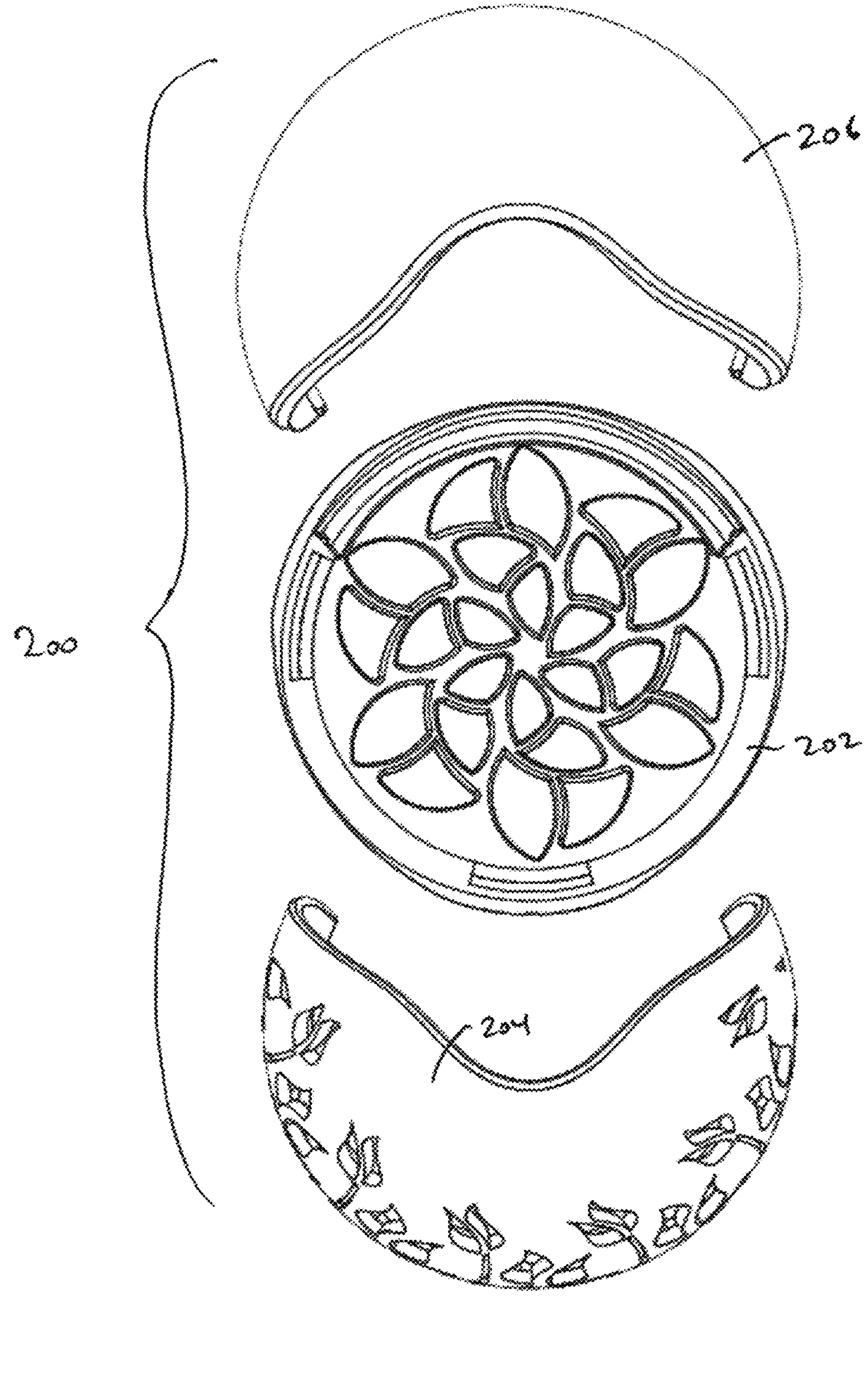
FIG. 14 is an exploded top view of the container of FIG. 6.

On the top surface 222 of the base 202 there are provided receptacles 224 for mounting of the grill 206. In the embodiment shown, there are three such receptacles 224 and they are each sized and configured to accept insertion of mounting lugs 226 found on the lower portion 228 of the grill 206. As best shown in FIG. 13, a cross sectional view through the container 200, the receptacles 224 each include a lock 230 formed with a ramped upper surface 232 and a flat lower surface 234. The lug 226 includes a rib 236, which is a bulbous portion at the lower end thereof. When inserted into the receptacle 224, the rib 236 slides against the ramped upper surface 232 of the receptacle and causes the lug 226 to deflect slightly as it cantilevers from the remainder of the grill 206. Upon passing the ramped upper surface 232 entirely, the lug 226 resumes its undeflected position and locks up against the flat lower surface 234 to connect the grill 206 to the base 202.

Figure 11:
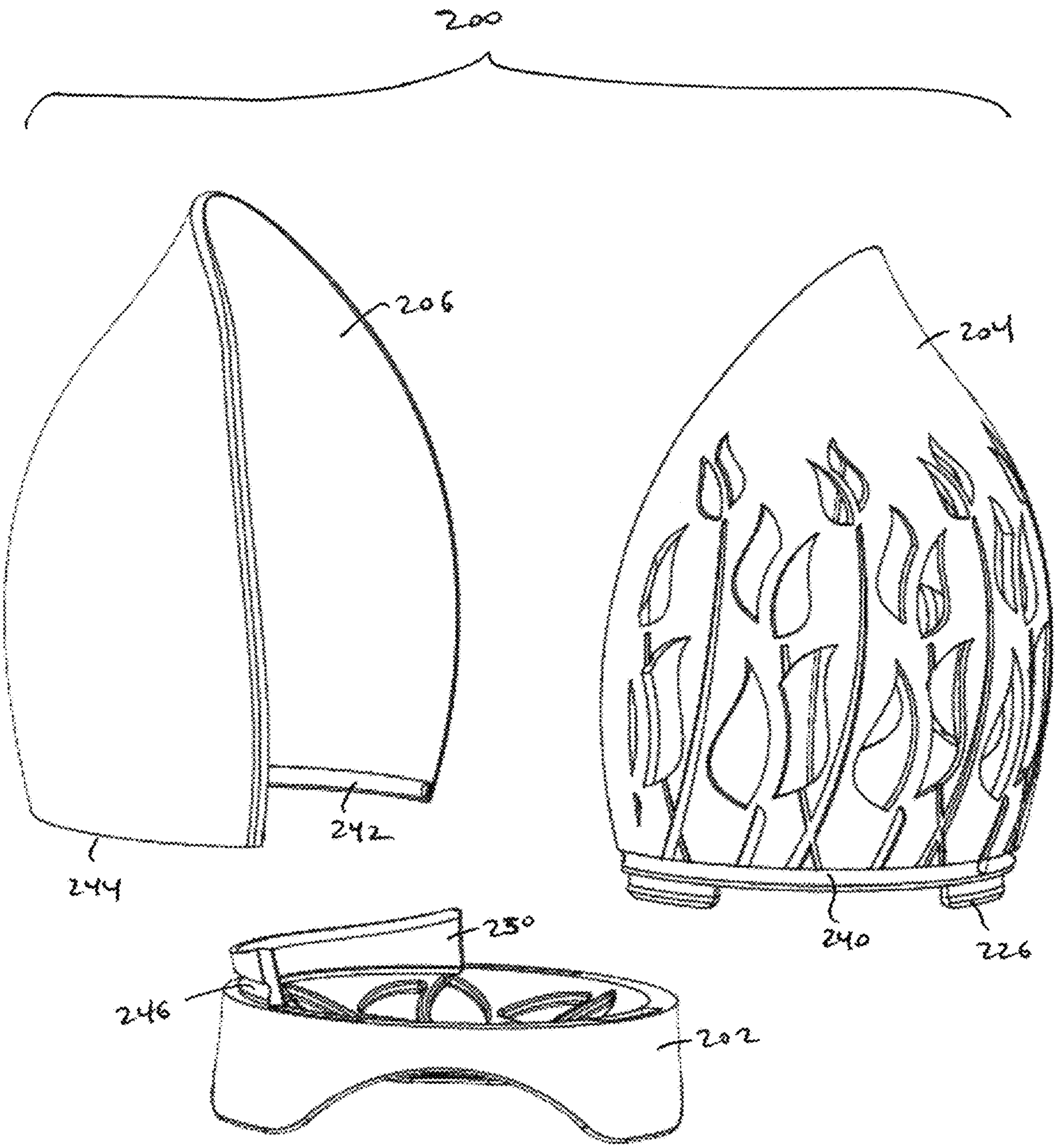
Figure 12:
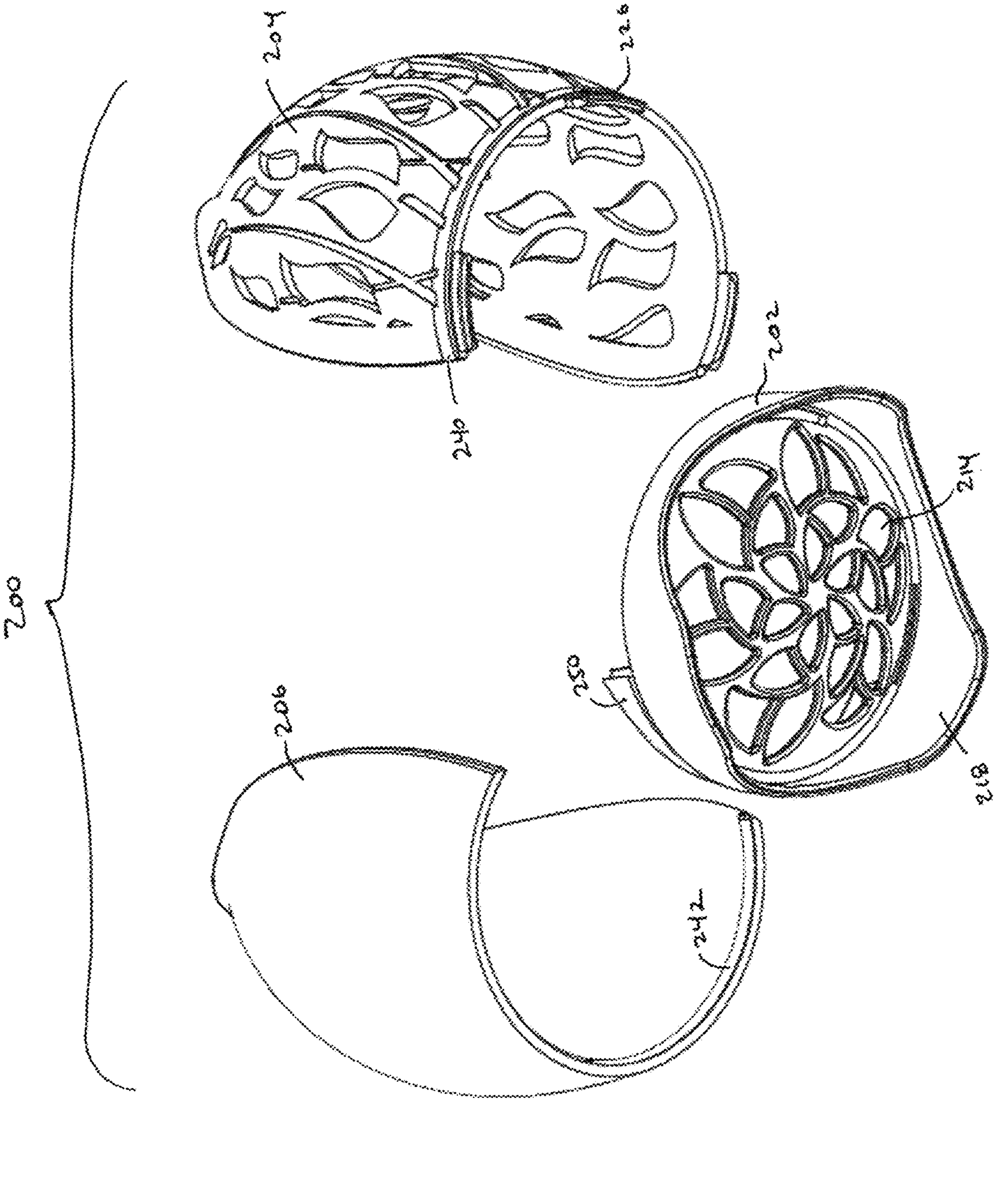
FIG. 12 is an exploded perspective view of the container of FIG. 6, shown from partially beneath the container.

Referring to FIG. 11, it will be appreciated that the grill includes a recessed track 240 extending around the lower portion 228 thereof while the base 202 includes a recessed track 246 carved within an extension 250 thereof, extending upward from the base 202. The recessed tracks 240, 246 are both C-shaped. The shell 206 includes a bead 242 extending around the interior portion of its lower portion 244, the bead 242 being sized and configured to fit within the recessed tracks 240, 246.

By virtue of the above-referenced interactions, it will be appreciated that the grill 204 is affixed directly to the base 202 in an immovable manner. In the meantime, the shell 206 attaches to the grill 204 and base 202 and may freely rotate about two components by virtue of the bead 242 of the shell travelling within the recessed tracks 240, 246 of the grill and base respectively. Such movement may be performed in infinitely variable steps from a completely closed condition of the container 200 shown in FIG. 6, to a partially open condition of the container shown in FIG. 8, and finally to a completely open condition of the container shown in FIG. 9 and vice-versa. In order to achieve such a result, it will be appreciated that the tracks 240, 246 are continuous in an intersection area 252 where they abut each other, as shown in FIG. 8.

The container 200 shown and described, in addition to other containers, have undergone testing described below. As will be seen, the results of the testing reveal that containers with cross-ventilation are advantageous over non-cross-ventilated containers in that they sponge/blenders placed therein dry faster.

Figure 18:
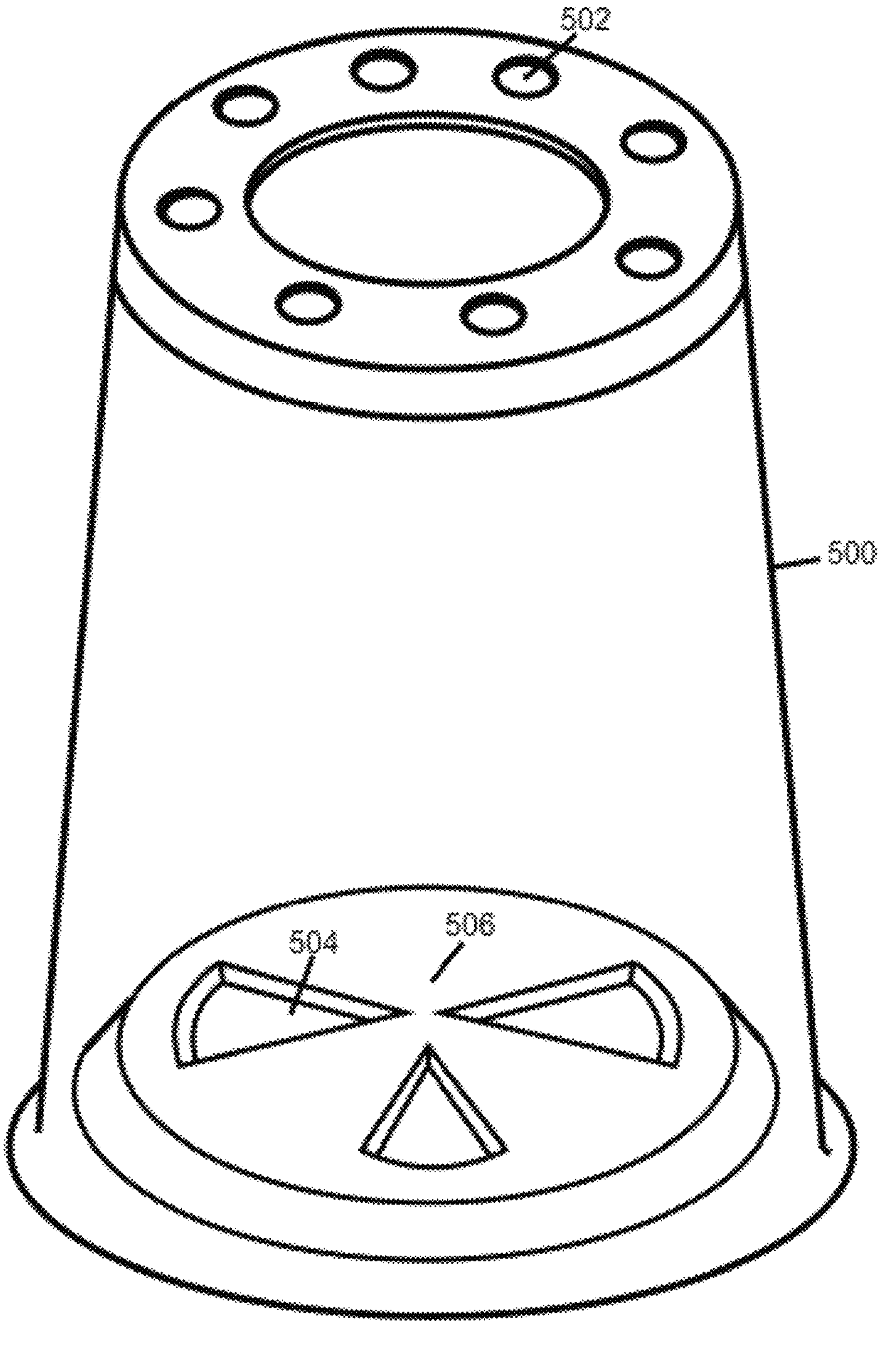
FIG. 18 is a perspective view of a second sponge/blender container, particularly used for test purposes, and configured in accordance with aspects of the invention.
Figure 19:
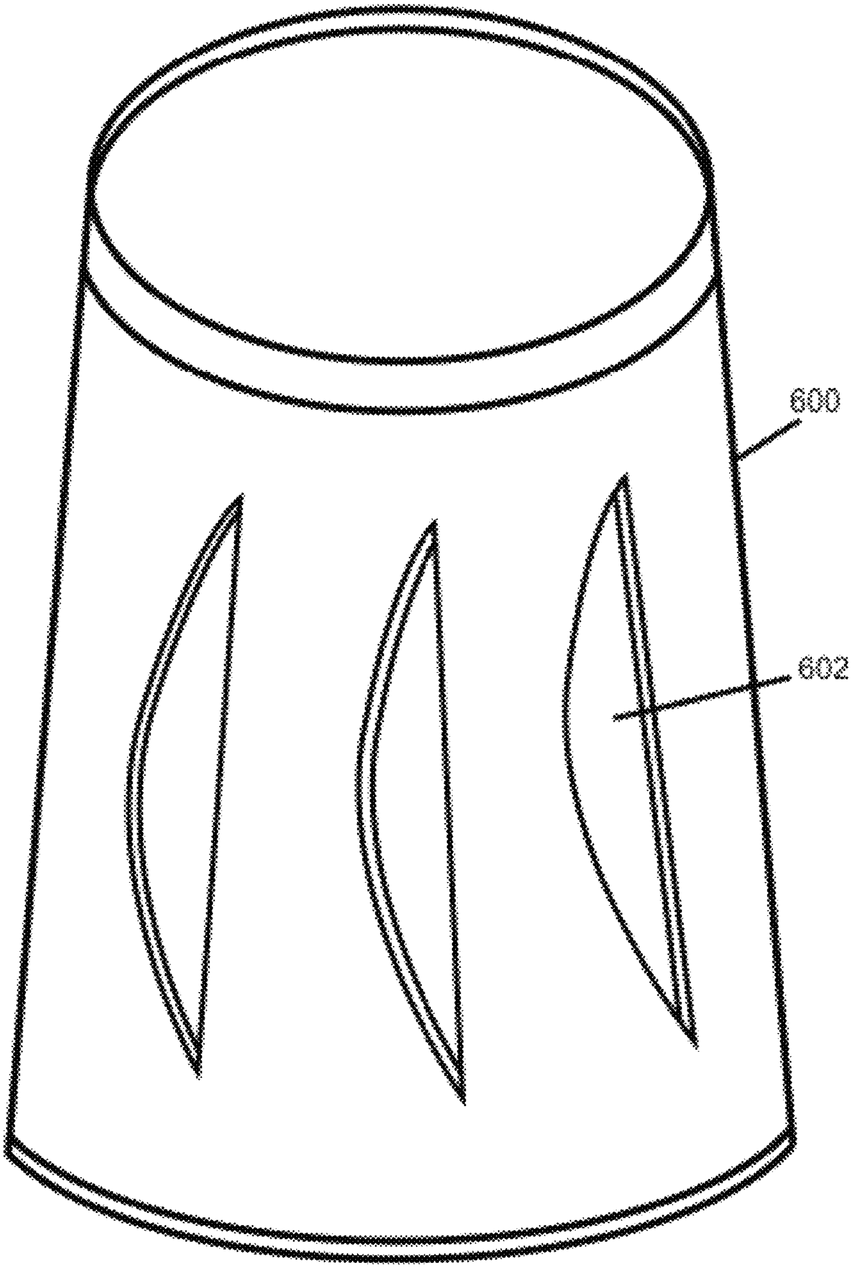
FIG. 19 is a perspective view of a third sponge/blender container, particularly used for test purposes, and configured in accordance with aspects of the invention.
Figure 20:
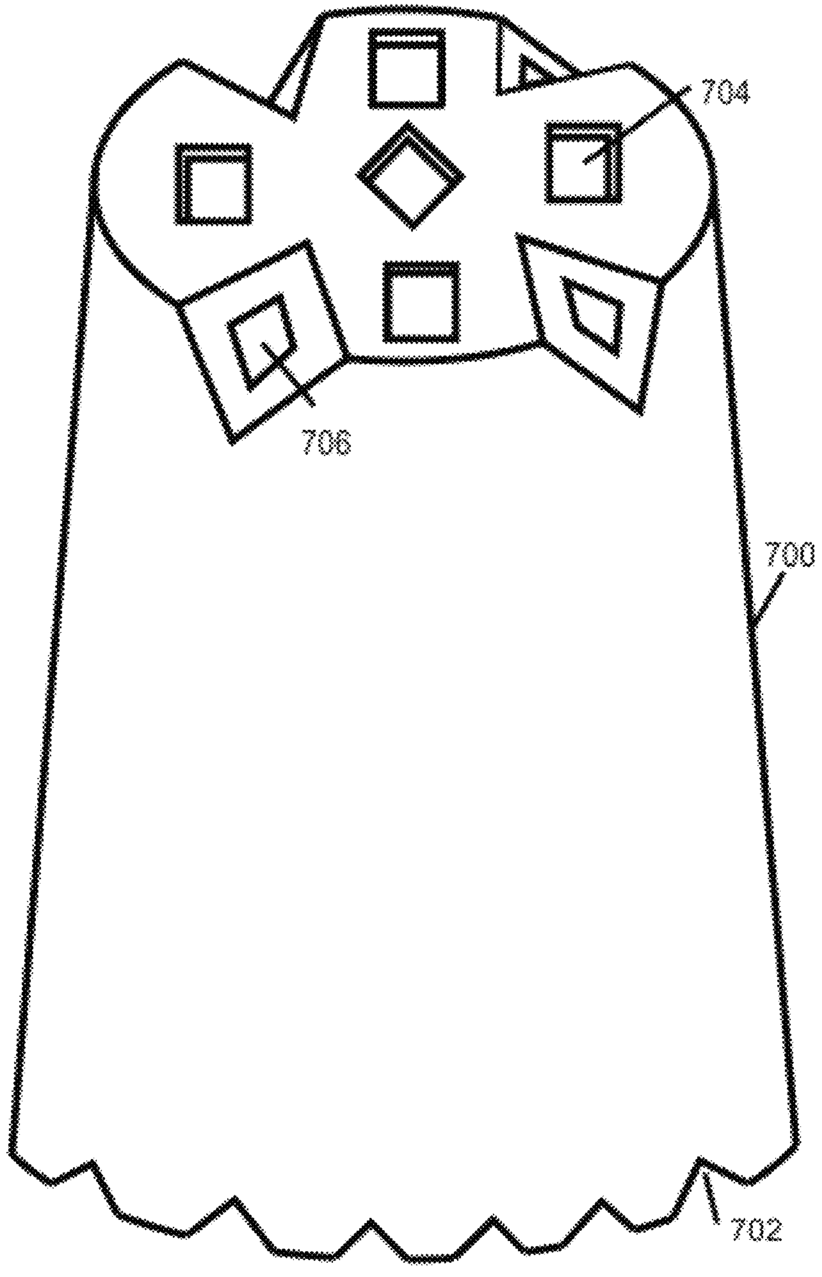
FIG. 20 is a perspective view of a fourth sponge/blender container, particularly used for test purposes, and configured in accordance with aspects of the invention.
Figure 21:
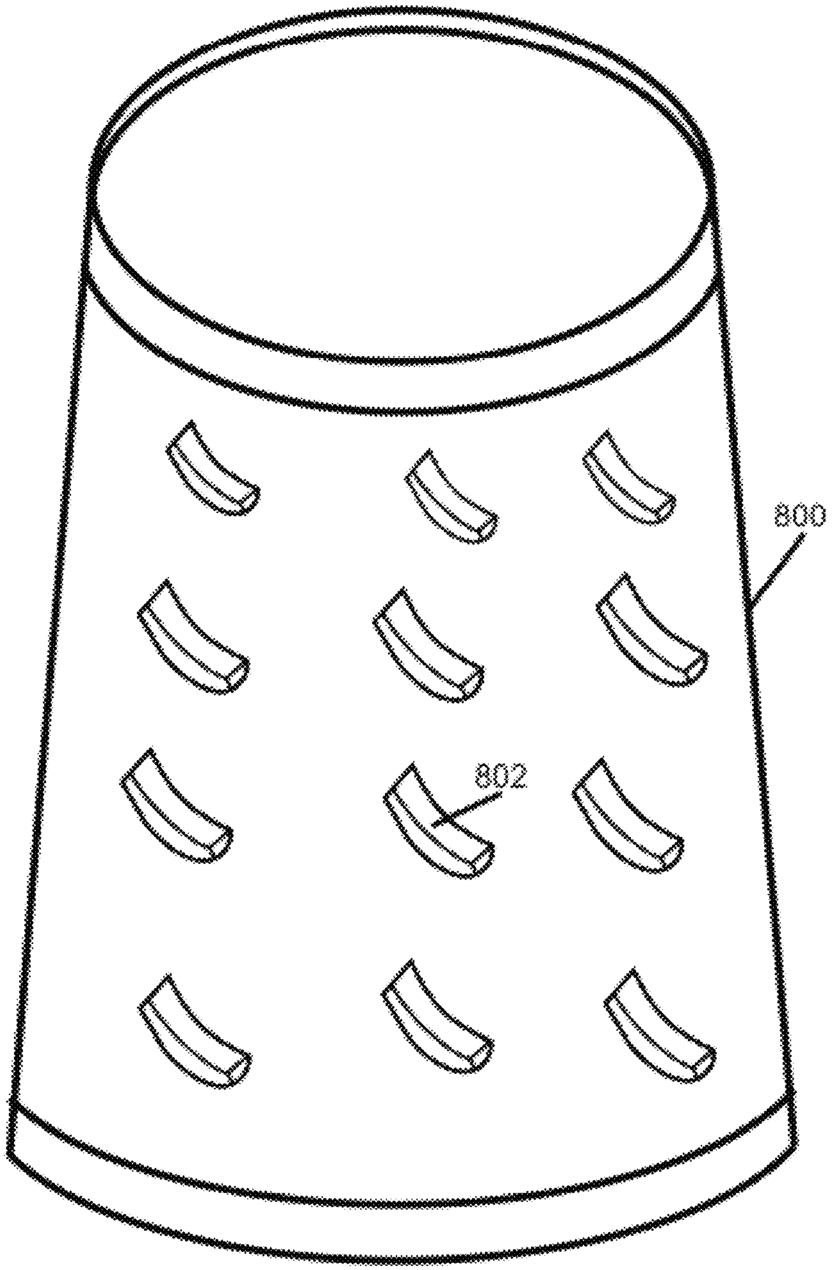
FIG. 21 is a perspective view of a fifth sponge/blender container, particularly used for test purposes, and configured in accordance with aspects of the invention.
Figure 22:
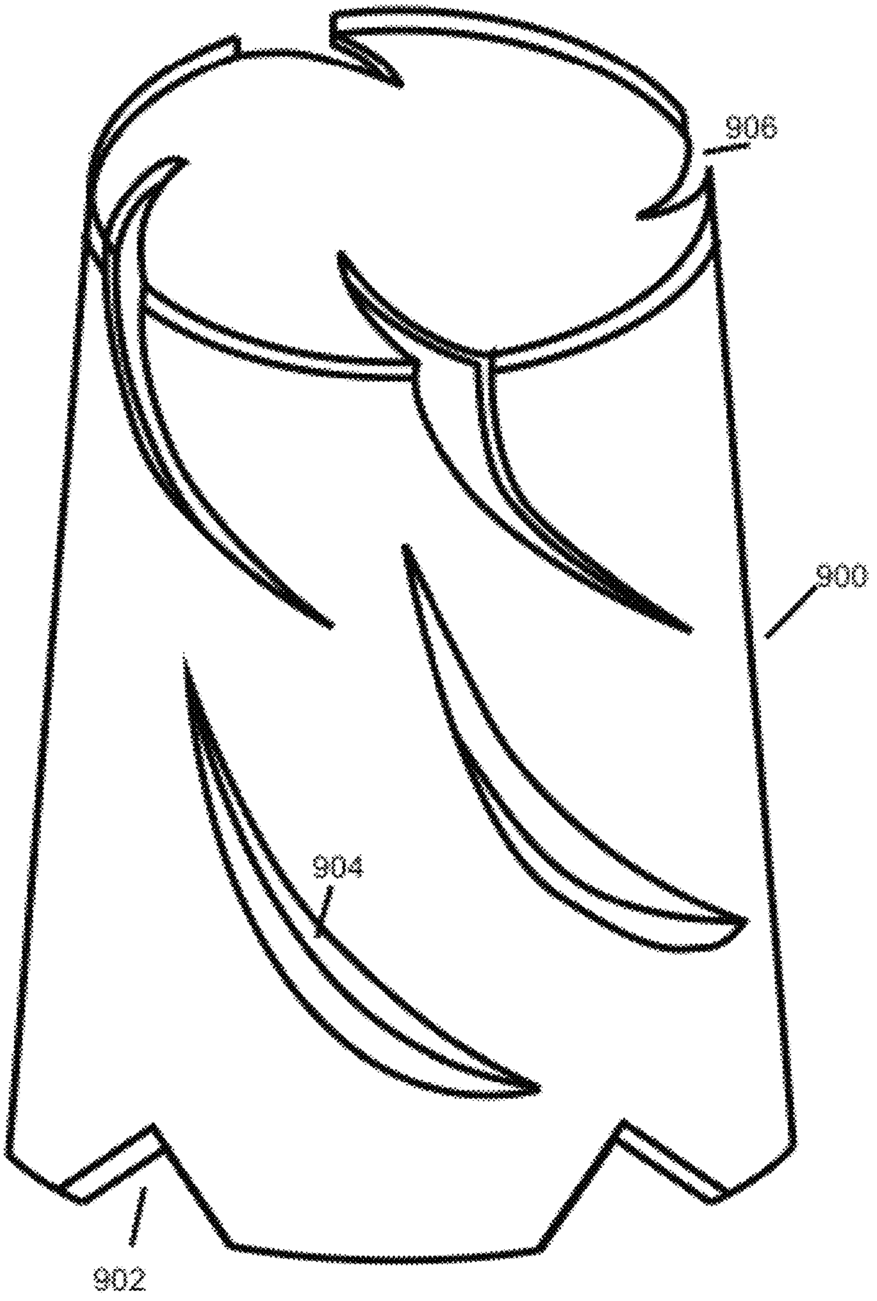
FIG. 22 is a perspective view of a sixth sponge/blender container, particularly used for test purposes, and configured in accordance with aspects of the invention.

In a first test, between the container 400 shown in FIG. 17 and the container 500 shown in FIG. 18, the level of moisture removed in an 8 hour timeframe was determined. For comparison purposes, the container 400 in FIG. 17 includes a single port 402 with four apertures 404 and an approximate surface area ventilation of 6-8%. With its single port 402 and four apertures 404, the container 400 does not exhibit cross-ventilation. Of particular note here is that the bottom 406 is closed. The container 500 of FIG. 18 was provided with apertures 502 along the top portion and apertures 504 along an elevated support stand 506. With this arrangement, the container 500 provides modified cross-ventilation from support stand 506 to top and vice-versa, the modification being that ventilation through the support stand does not reach externally to the container.

To conduct the test, a single moistened sponge/blender weighing 16 grams was placed in each container (a completely dry sponge/blender weighs 8 grams, the 16 grams accounting for an additional 8 grams of retained liquid). After 8 hours each of the sponge/blenders was weighed. The sponge/blender from container 400 exhibited 0 grams of drying and therefore still weighed 16 grams while the container 500 exhibited 2 grams of drying and therefore weighed 14 grams.

A second test was then conducted using the containers of FIGS. 19 through 22, namely containers 600, 700, 800, 900, all formed from Styrofoam drinking cups. It will be appreciated that container 600 includes ventilation apertures 602 only on the side of the container spaced relatively evenly around the perimeter; container 700 includes ventilation apertures (or slots) 702 at the base of the container and ventilation apertures 704 at the extreme top portion, with additional apertures 706 at the junction between the top and the side; container 800 includes ventilation apertures 802 only on the side of the container around its entire perimeter; and container 900 includes ventilation apertures (or slots) 902 at the base of the container, and ventilation apertures 904 at the side of the container, some of which form ventilation apertures 906 at intersection of the top of the container and side of the container for maximum cross-ventilation.

After 8 hours of drying time for 16 gram moistened sponge/blenders in each container, only container 900 exhibited an appreciable level of drying, with a 2 gram reduction to 14 grams.

Figure 23:
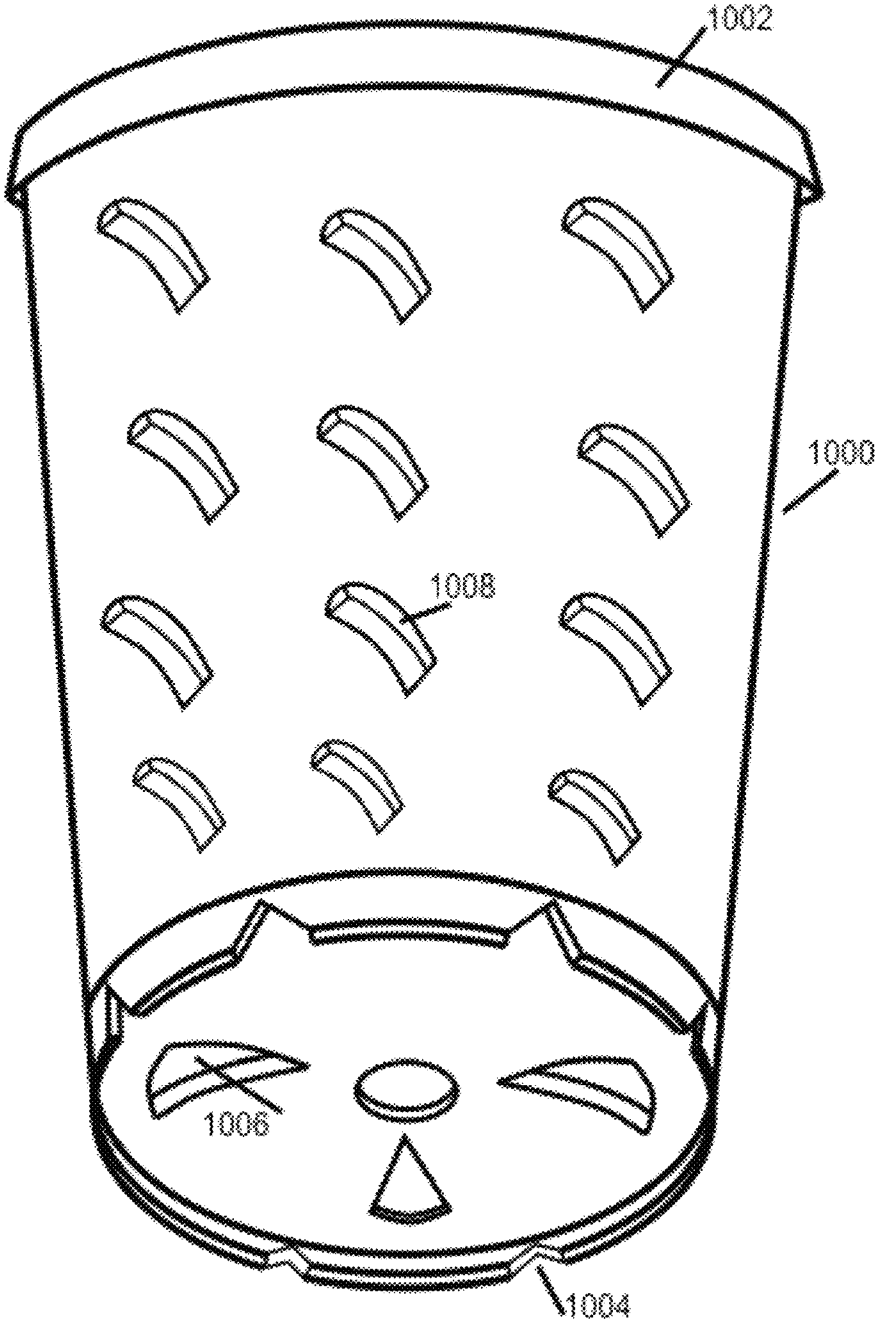
FIG. 23 is a perspective view of a seventh sponge/blender container, particularly used for test purposes, and configured in accordance with aspects of the invention.
Figure 24D:
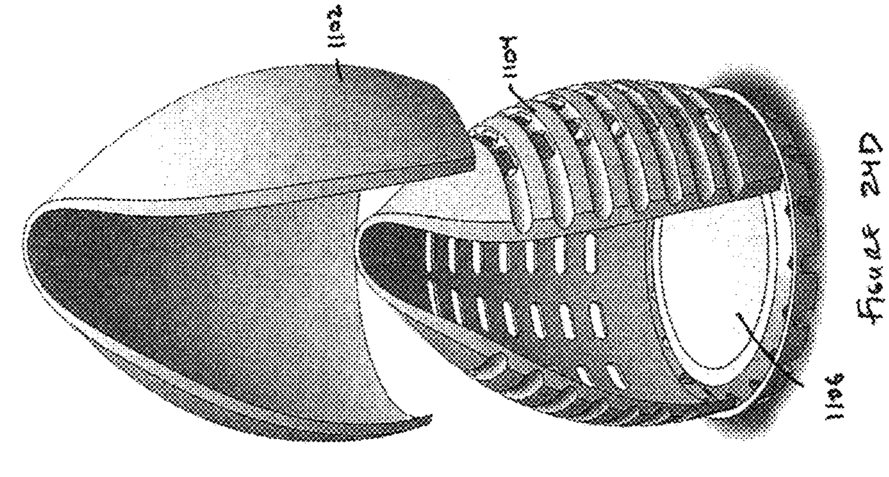
FIGS. 24A through 24D depict multiple views of a further embodiment an inventive container in accordance with the present invention, the views including a front perspective view of a closed container in FIG. 24A, a side perspective view of an open container in FIG. 24B, a bottom perspective view of a closed container in FIG. 24C, and an exploded perspective view in FIG. 24D.
Figure 24A:
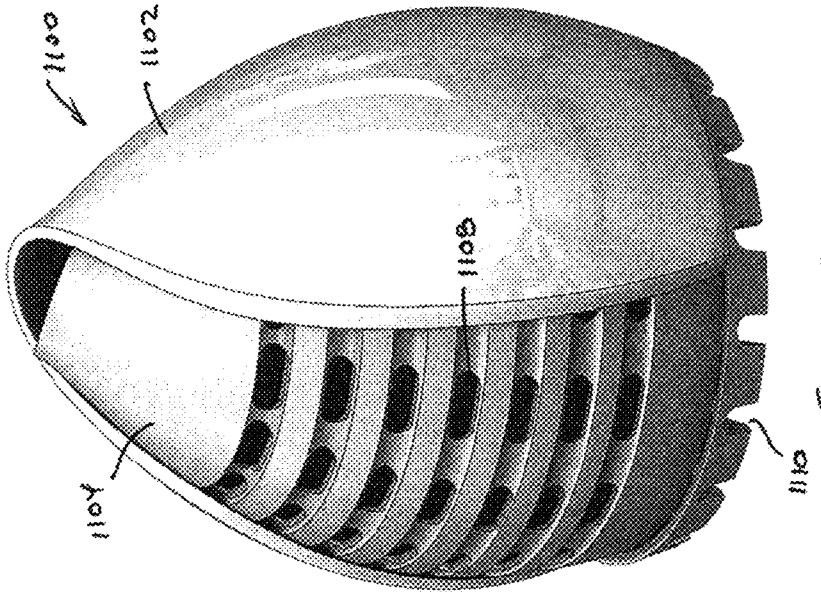
Figure 24B:
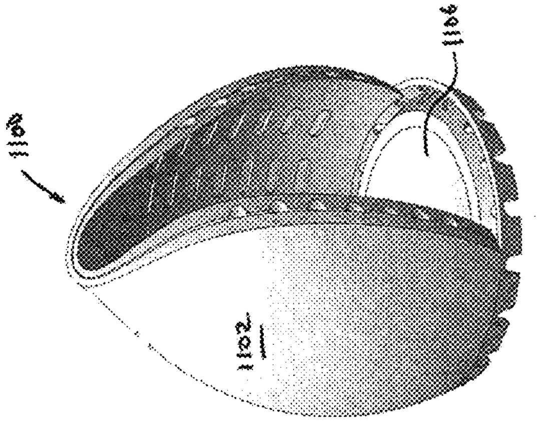
Figure 24C:
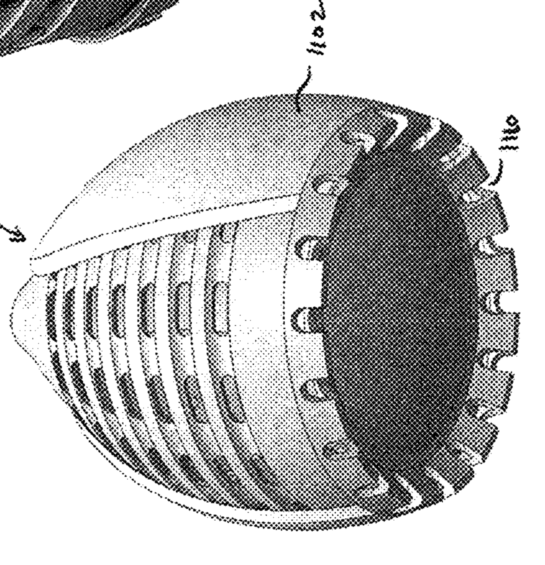

In a third test, a sponge/blender in container 400 was tested against a sponge/blender in container 1000 of FIG. 23. Container 1000 was again formed from a Styrofoam cup, this time with a lid 1002 covering its natural opening at the top (not shown). The base includes both apertures (or slots) 1004 at the side of the base and apertures 1006 underneath the base. The container 1000 also included apertures 1008 at the side of the container and again was finally capped with lid 1002.

After 8 hours of testing these two containers 400, 1000, container 400 again exhibited no appreciable change from its initial 16 gram test weight while container 1000 exhibited a 4 gram reduction from 16 grams to 12 grams, again proving the effectiveness of cross-ventilation.

In a fourth test, container 900 was tested against container 1000. This time after 8 hours of drying time container 900 exhibited 1 gram of weight reduction from 16 grams while container 1000 exhibited no appreciable difference from its 16 gram starting weight. The test was then extended another 4 hours for a total of 12 hours. After that extended test, both containers exhibited a 1 gram reduction from 16 grams to 15 grams total.

To summarize these test results, it became apparent that cross-ventilation provided by base ventilation and either side or top ventilation was most effective.

In a final test, the conventional container 400 was compared with the container 200 shown in FIGS. 6-14, in the closed condition. Here, sponges/blenders weighing 13 grams were placed in each container and held for 24 hours. The conventional container 400 exhibited signs of condensation building on the interior surfaces as air was unable to circulate to dry out the sponge/blender due to lack of cross-ventilation. Moreover, the sponge/blender stored in container 400 retained its full 13 gram weight. In the meantime, the sponge/blender stored in the container 200 weighed 10 grams after the test.

Figure 15:
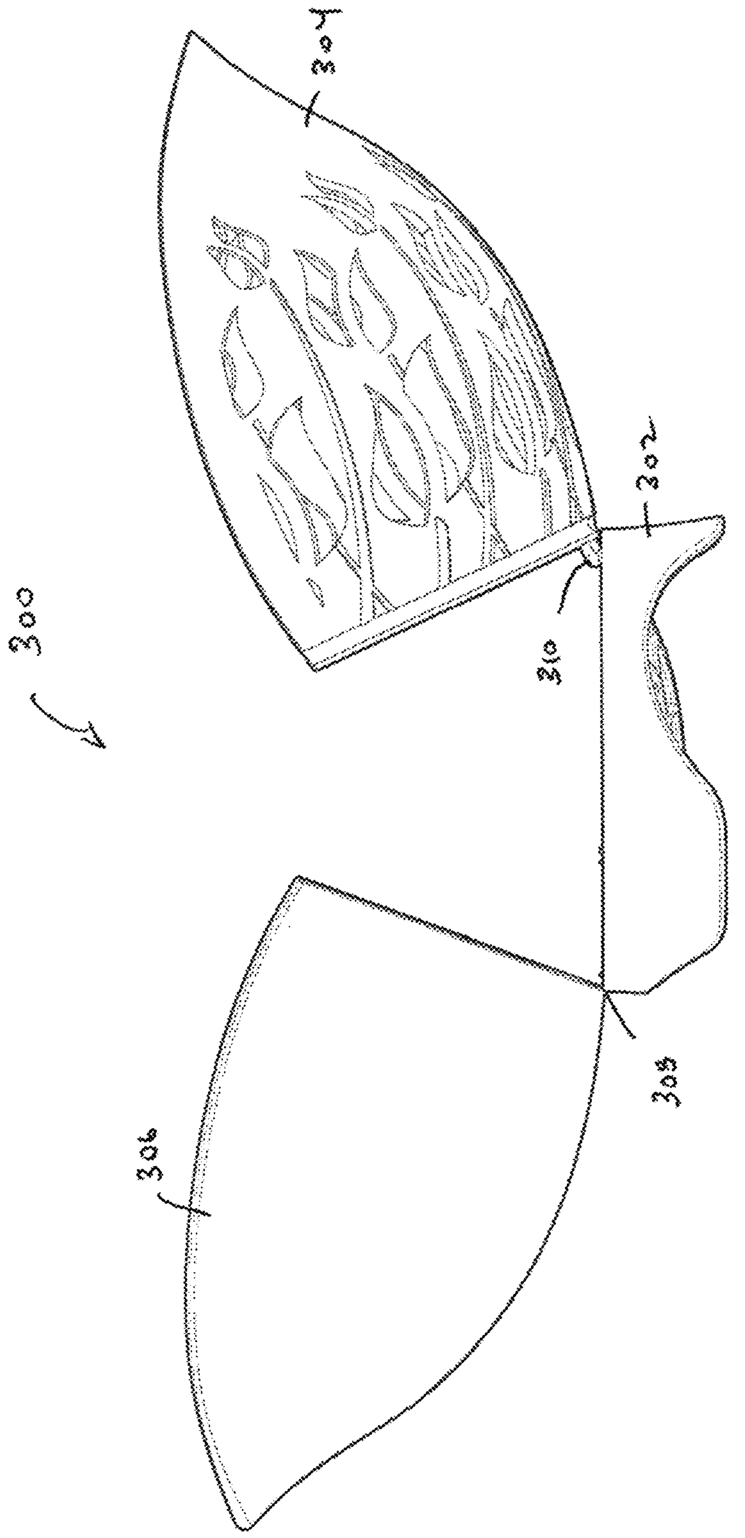
FIG. 15 is side view of a further embodiment of an inventive container in accordance with the present invention, the container being in the open condition.
Figure 16:
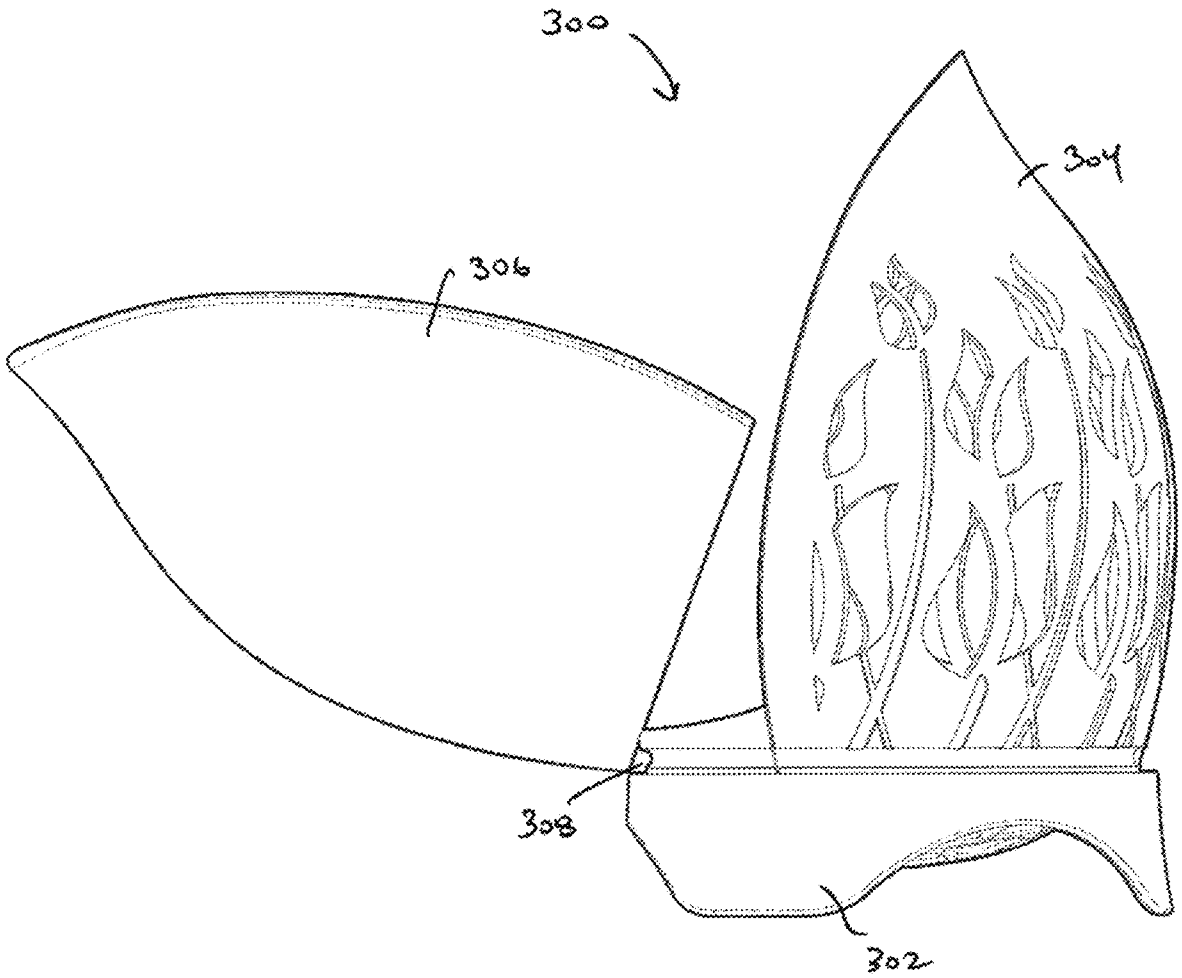
FIG. 16 is a side view of the container of FIG. 15, the container being in a partially open condition.

In a further embodiment of the present invention, shown in FIGS. 15 and 16, there is provided a container having a pair of hinges and combining features of containers 100 and 200. Accordingly, the container 300 includes a base 302, a grill 304, and a shell 306, where the grill and shell are connected to the base with hinges 308, 310. As shown in FIG. 15, the grill 304 and shell 306 can pivot from the base 302 of the container 300 to place the container in an open condition. As shown in FIG. 16, the grill 304 can pivot toward the base 302 to partially close the container 300. Although not shown, the shell 306 can also pivot with respect to the base 302 to fully enclose the container, in which case the container takes on a form very similar to the container 200 shown in FIG. 6. In this regard, it will be appreciated that the grill 304 is slightly smaller than the shell 306 such that the grill may partially overlap with the shell near the base 302.

In accordance with further embodiments of the present invention, FIGS. 24A through 24D depict further views of a container 1100. The container 1100 includes a shell 1102, grill 1104, and base 1106, where the shell and base include apertures 1108, 1110, respectively, for cross-ventilation. As in other embodiments, the grill 1104 is fixed to the base 1106 and the shell 1102 rotates around the grill to open or close the container 1100.

Figure 25B:
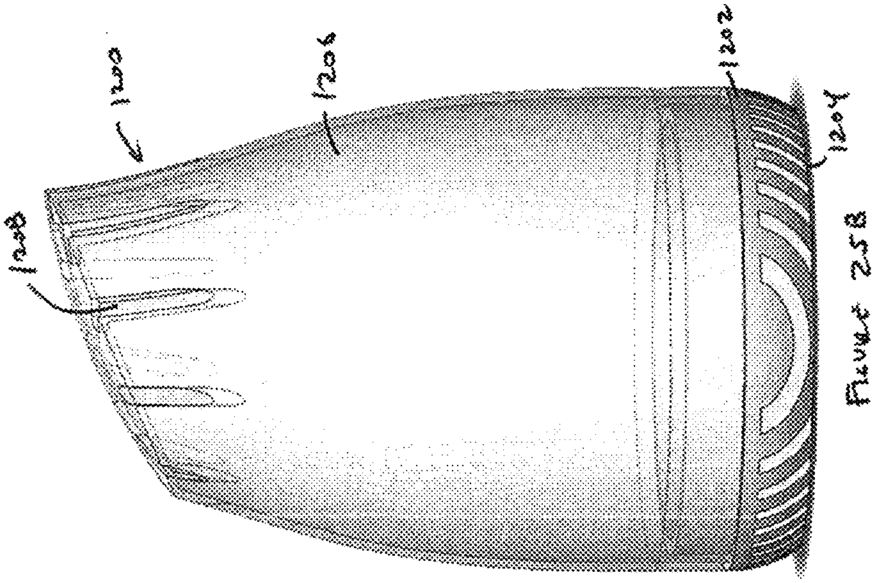
FIGS. 25A through 25C depict multiple views of an additional embodiment an inventive container in accordance with the present invention, the views including a front perspective view FIG. 25A, a side perspective view in FIG. 25B, and an exploded perspective view in FIG. 25C; and, FIGS. 26A through 26D depict multiple views of a still further embodiment an inventive container in accordance with the present invention, the views including a front perspective view of a closed container in FIG. 26A, a top perspective view of an open container in FIG. 26B, a side perspective view of a container in multiple states of opening in FIG. 26C, and a bottom perspective view in FIG. 26D.
Figure 25A:
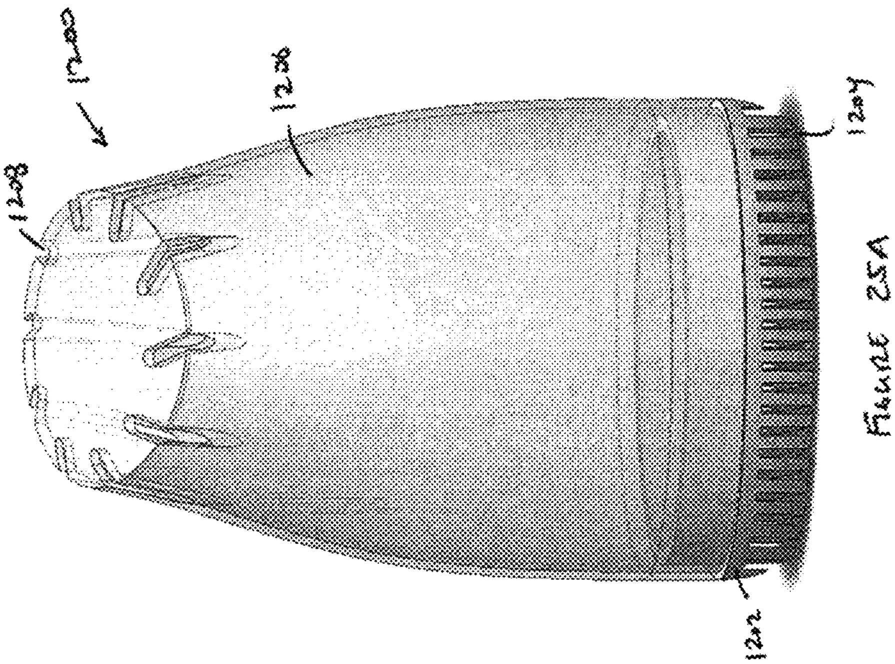
Figure 25C:
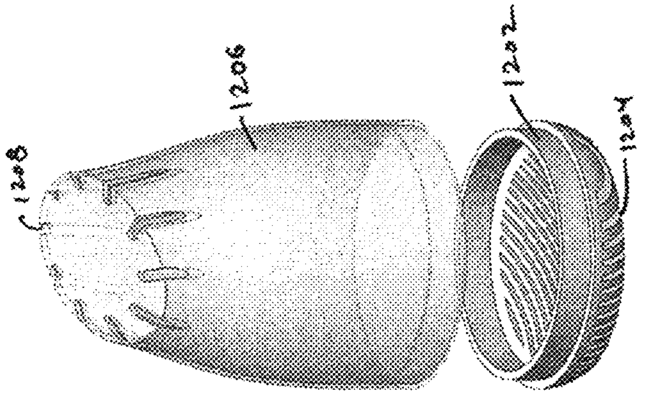
Figure 26C:
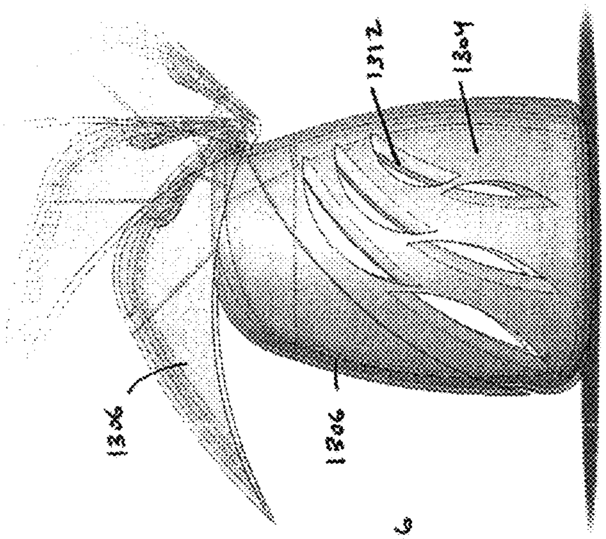
Figure 26A:
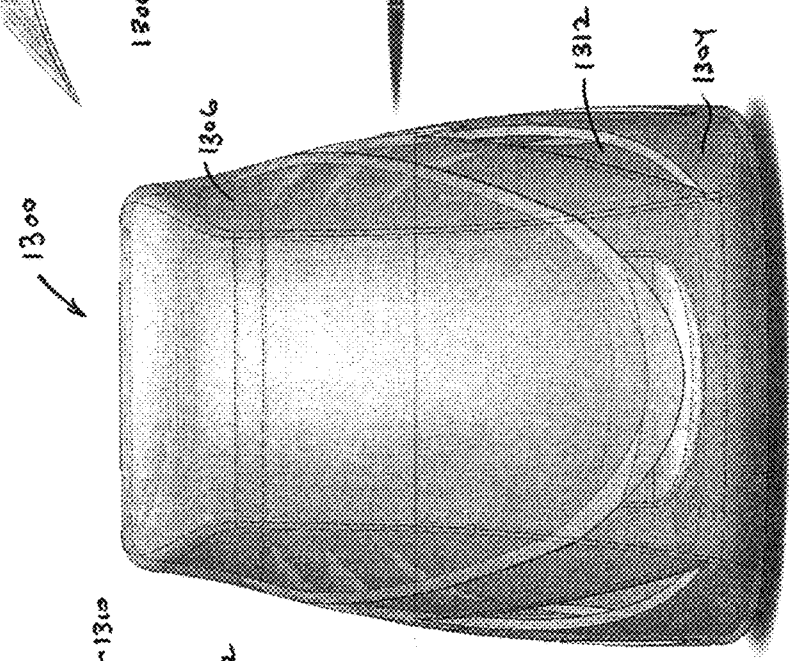
Figure 26D:
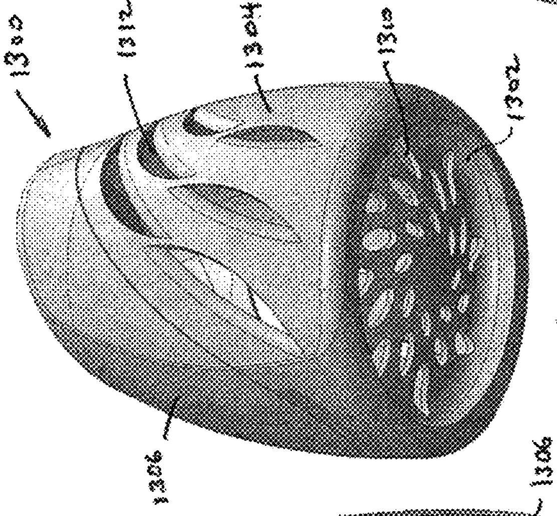
Figure 26B:
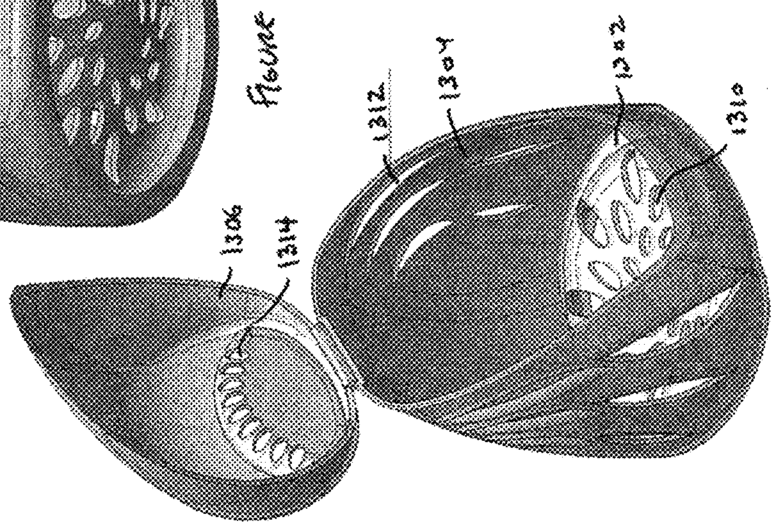

FIGS. 25A through 25C depict multiple views of an additional embodiment an inventive container 1200 in accordance with the present invention. Here, the container 1200 includes a base 1202 with apertures 1204 in the form of slots. Upon the base 1202 is provided a main cover 1206 with apertures 1208 through its upper portion. The main cover 1206 may be attached to the base 1202 as shown in FIG. 25A to close the container 1200 or may be removed from the base as shown in FIG. 25C to open the container. Together the apertures 1204, 1208 provide cross-ventilation.

FIGS. 26A through 26D depict multiple views of a another embodiment an inventive container 1300 in accordance with the present invention. Here, a container 1300 includes a base 1302 with a shell 1304 mounted on top. A lid 1306 is hinged to the shell 1304 to provide a means for opening and closing the container 1300. In some embodiments the base 1302 and shell 1304 may be formed as one component. The base includes apertures 1310, the shell includes a series of apertures 1312, and the lid includes a series of apertures 1314. Together these apertures 1310, 1312, 1314 provide cross-ventilation.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

I claim:

1. A cosmetic sponge drying and storage container comprising:

a first component configured to form a first open cavity;

a second component configured to form a second open cavity, said first component adapted to partially overlap at least a portion of said second component and enclose said second open cavity to place said container in a closed condition capable for storage of a cosmetic sponge therein, said first component and said second component being at least partially separable to place said container in an open condition;

a plurality of first component apertures extending through said first component and a plurality of second component apertures extending through said second component, said first component apertures and said second component apertures providing, in said closed condition, cross-ventilation through said container capable of drying said cosmetic sponge when such a cosmetic sponge is placed in said container in said closed condition;

wherein said plurality of first component apertures forms a first flower and said plurality of second component apertures forms a second flower;

wherein said first component is adapted to partially overlap said second component with a friction fit.

2. The cosmetic sponge drying and storage container of claim 1, wherein said first component and said second component together form a base of said container, said base having a flat portion for standing said container in an upright position when in said closed condition.

3. The cosmetic sponge drying and storage container of claim 2, wherein said overall shape of said container in said closed condition is approximately that of a pointed egg.

4. The cosmetic sponge drying and storage container of claim 3, wherein said plurality of first component apertures and said plurality of second component apertures are sized and configured to prevent penetration from a conventional eyeliner pencil.

5. The cosmetic sponge drying and storage container of claim 1, wherein at least one of said plurality of first component apertures forms a first arch.

6. The cosmetic sponge drying and storage container of claim 5, wherein at least one other of said plurality of first component apertures forms a second arch.

7. The cosmetic sponge drying and storage container of claim 5, further comprising a living hinge connecting said first component to said second component.

8. The cosmetic sponge drying and storage container of claim 1, further comprising a living hinge connecting said first component to said second component.

9. A cosmetic sponge drying and storage container comprising:

a first oblong component configured to form a first open cavity, said first oblong component having a first longitudinal axis between a first end and a second end;

a second oblong component configured to form a second open cavity, said second oblong component having a second longitudinal axis between a third end and a fourth end;

said first component adapted to partially overlap said second component, with said first longitudinal axis parallel to said second longitudinal axis, to enclose said second open cavity and place said container in a closed condition capable for storage of a cosmetic sponge therein, said first component and said second component being at least partially separable to place said container in an open condition;

a plurality of first oblong component apertures extending through said first oblong component and a plurality of second oblong component apertures extending through said second component, said plurality of first oblong component apertures and said plurality of second oblong component apertures providing, in said closed condition, cross-ventilation through said container capable of drying said cosmetic sponge when such a cosmetic sponge is placed in said container in said closed condition;

wherein said first end tapers along said first longitudinal axis to a point on said first oblong component and said third end tapers to a point along said second longitudinal axis on said second oblong component;

wherein said second end of said first oblong component is flat and said fourth end of said second oblong component is flat.

10. The cosmetic sponge drying and storage container of claim 9, wherein said first oblong component apertures form a first flower and said second oblong component apertures form a second flower.

11. The cosmetic sponge drying and storage container of claim 10, wherein said first component is adapted to partially overlap said second component with a friction fit.

12. The cosmetic sponge drying and storage container of claim 9, wherein at least one of said first oblong component apertures or said second oblong component apertures forms an arch.

13. The cosmetic sponge drying and storage container of claim 12, further comprising a living hinge connecting said first oblong component and said second oblong component.

14. The cosmetic sponge drying and storage container of claim 9, wherein said first oblong component apertures form circles.

15. A cosmetic sponge drying and storage container comprising:

a first component configured to form a first open cavity;

a second component configured to form a second open cavity, said first component adapted to partially overlap said second component and enclose said second open cavity to place said container in a closed condition capable for storage of a cosmetic sponge therein, said first component and said second component being at least partially separable to place said container in an open condition;

a plurality of apertures extending through either or both of said first component and said second component, said apertures providing, in said closed condition, cross-ventilation through said container capable of drying said cosmetic sponge when such a cosmetic sponge is placed in said container in said closed condition.

16. The cosmetic sponge drying and storage container of claim 15, wherein said apertures extend through said first component and said second component, and said apertures form a first flower in said first component and a second flower in said second component.

17. The cosmetic sponge drying and storage container of claim 15, wherein said apertures extend through said first component and said second component, and at least some of said apertures are circular.

18. A cosmetic sponge drying and storage container comprising:

a first component configured to form a first open cavity;

a second component configured to form a second open cavity, said first component adapted to partially overlap at least a portion of said second component and enclose said second open cavity to place said container in a closed condition capable for storage of a cosmetic sponge therein, said first component and said second component being at least partially separable to place said container in an open condition;

a plurality of first component apertures extending through said first component and a plurality of second component apertures extending through said second component, said first component apertures and said second component apertures providing, in said closed condition, cross-ventilation through said container capable of drying said cosmetic sponge when such a cosmetic sponge is placed in said container in said closed condition;

wherein at least some of said plurality of first component apertures are circles.

19. The cosmetic sponge drying and storage container of claim 18, wherein at least some of said second component apertures are circles.

* * * * *